(12) United States Patent
Nakatsugawa

(10) Patent No.: US 7,649,598 B2
(45) Date of Patent: Jan. 19, 2010

(54) OPTICAL ELEMENT AND LIQUID CRYSTAL DISPLAY DEVICE, AND METHOD OF PRODUCING OPTICAL ELEMENT

(75) Inventor: Yuji Nakatsugawa, Matsudo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 287 days.

(21) Appl. No.: 11/905,974

(22) Filed: Oct. 5, 2007

(65) Prior Publication Data

US 2008/0088780 A1 Apr. 17, 2008

(30) Foreign Application Priority Data

Oct. 16, 2006 (JP) .............. 2006-281012

(51) Int. Cl.
*G02F 1/1335* (2006.01)
(52) U.S. Cl. .............. 349/117; 349/118; 349/187; 349/193
(58) Field of Classification Search .............. 349/106, 349/117, 118, 130, 183, 187, 193, 194; 359/500; 428/1.3, 1.31; 430/20, 321
See application file for complete search history.

(56) References Cited

U.S. PATENT DOCUMENTS 7,286,199 B2 * 10/2007 Moriya .............. 349/117

2005/0179003 A1 8/2005 Heckmeier et al.
2007/0087135 A1 * 4/2007 Hayashi .............. 428/1.3

FOREIGN PATENT DOCUMENTS

| JP | A 10-508882 | 9/1998 |
| JP | A 2001-100045 | 4/2001 |
| JP | A 2004-524385 | 8/2004 |
| JP | A 2006-028346 | 2/2006 |
| WO | WO 96/02597 A2 | 2/1996 |

* cited by examiner

*Primary Examiner*—Dung Nguyen
*Assistant Examiner*—Tai Duong
(74) *Attorney, Agent, or Firm*—Oliff & Berridge, PLC

(57) ABSTRACT

The present invention intends to provide an optical element that can be incorporated in a liquid crystal display device, is provided with a birefringent layer obtained by aligning and polymerizing polymerizable liquid crystal molecules, and, while sufficiently reflecting an actual condition of a liquid crystal display device, can reduce fear that a thickness of a driving liquid crystal layer unexpectedly varies. An optical element includes a light-transmitting base material and a birefringent layer comprising of aligned and polymerized liquid crystal molecules and having a value of indentation depth of 6% or less relative to a thickness of the birefringent layer, wherein said value is measured under conditions where a cylindrical indenter having a diameter of 30 (μm) is applied at a load of 10 mN/sec up to the maximum load of 400 mN.

8 Claims, 2 Drawing Sheets

OPTICAL ELEMENT AND LIQUID CRYSTAL DISPLAY DEVICE, AND METHOD OF PRODUCING OPTICAL ELEMENT

BACKGROUND OF THE INVENTION

1. Field of the Invention

The present invention relates to an optical element, a liquid crystal cell and liquid crystal display device with the optical element and a method of producing the optical element.

2. Description of the Related Art

Liquid crystal display devices (LCD), having advantages such as being capable of easily thinning and saving weight, capable of saving consumption power and difficult to generate flickers, are used in various fields such as TVs and medical equipments.

A liquid crystal display device is provided with a liquid crystal cell that controls retardation of light and the liquid crystal cell is sandwiched between polarization plates in a thickness direction of the liquid crystal cell to switch light (control of an amount of light propagating toward an observer side of a liquid crystal screen on which an image is displayed). The liquid crystal cell has two substrates that face each other with a definite distance separated and a liquid crystal layer (driving liquid crystal layer) formed by encapsulating a liquid crystal material between two substrates is constituted by forming so that the alignment properties of liquid crystal molecules (driving liquid crystal molecules) contained in the liquid crystal material may be controlled by an electric field. Regarding two substrates, a substrate near to an observer of a liquid crystal screen is named a display side substrate and a substrate that faces the display side liquid crystal substrate with a driving liquid crystal layer sandwiched therebetween is named a driving liquid crystal side substrate. A liquid crystal display device is provided with, as needs arise, outside of a polarization plate, a backlight unit that supplies light propagating through a liquid crystal layer in a liquid crystal cell in a direction from the driving liquid crystal side substrate to the display side substrate.

A liquid crystal screen provided to a liquid crystal display device is formed by gathering a lot of pixels and an image displayed on the liquid crystal screen is formed of lights propagating outward from the respective pixels (toward an observer). In order to improve quality of an image displayed on a liquid crystal display device, it is important to strictly control light propagating toward an observer, that is, it is important to adjust retardation of light transmitting a driving liquid crystal layer formed in a liquid crystal cell thereby strictly controlling light switching.

In such a liquid crystal display device, in some cases, a thickness of the driving liquid crystal layer may vary unexpectedly largely owing to an acting force externally applied on a liquid crystal cell during production or usage of a liquid crystal cell. When a liquid crystal display device undergoes an unexpected large change in a thickness of a driving liquid crystal layer, an amount of retardation of light, which shows the optical characteristics thereof, unexpectedly varies. This makes switching control of light difficult, and it directly results in deteriorating image quality displayed on a liquid crystal screen.

In this connection, usually, in order to inhibit a thickness of a driving liquid crystal layer from readily varying owing to an external acting force, a lot of hard spacers are dispersively arranged between two opposed substrates. However, when a layer structure largely softer than the spacers is formed on a substrate that constitutes a liquid crystal cell, even when spacers arranged in a liquid crystal display device are very hard, ultimately, there remains a problem that a thickness of a driving liquid crystal layer readily varies. That is, for example, when, in a liquid crystal display device, a soft layer structure is formed on a substrate surface and on the layer structure spacers are dispersively arranged, owing to an external acting force, the spacers readily subside in the layer structure to result in changing a thickness of the driving liquid crystal layer.

However, recently, an optical element where a liquid crystal material containing liquid crystal molecules (polymerizable liquid crystal molecules) having a polymerizable functional group is coated on a substrate to form a coating film and the polymerizable liquid crystal molecules contained in the coating film are polymerized to make the coating film a birefringent layer as an optical functional layer having an optical compensation function that causes birefringence of light is proposed and a liquid crystal display device where an optical element is incorporated so that the birefringent layer may be located between a substrate and a driving liquid crystal layer is proposed (for example, Japanese Patent Application Laid Open (JP-A) No. 2001-100045 and Japanese Patent Application National Publication (Laid Open) No. 10-508882). In the case of the liquid crystal display device, a situation that, on a birefringent layer that is an optical functional layer formed on a substrate, spacers are dispersively arranged to constitute a liquid crystal display device happens. In the liquid crystal display device constituted like this, in comparison with a liquid crystal display device in which a birefringent layer is not formed, the possibility that the spacers such as mentioned above subside tends to be larger; accordingly, a situation that a thickness of a driving liquid crystal layer easily unexpectedly varies is likely to occur.

Regarding the point, in JP-A No. 2006-28346, as to an optical element having an optical functional layer obtained by polymerizing polymerizable liquid crystal molecules, in order to keep the hardness of the optical functional layer high, a technology where, in particular, the hardness of the optical functional layer is set to 17 or more by Vickers hardness or B or more by the pencil hardness is proposed.

However, the Vickers hardness or pencil hardness such as shown in JP-A No. 2006-28346 cannot be said a value obtained by a measurement method that sufficiently reflects actual conditions of the spacers generally used in recent liquid crystal display devices and actual conditions of general usage environment of liquid crystal cells.

For example, the Vickers hardness value in JP-A No. 2006-28346 is, as shown in JIS Z 2244-03, a value obtained by measuring an indentation depth of an optical functional layer by use of an indenter with a quadrilateral tip end. Accordingly, the obtained value cannot be said a value that is measured by a measurement method that reflects actual conditions of the spacers, where, in recent years, cylindrically-shaped spacers are usually used for a liquid crystal display device.

Furthermore, the pencil hardness value in JP-A No. 2006-28346 is a value obtained by measuring the scratch hardness of an optical functional layer; accordingly it cannot be said a value measured by a measurement method that sufficiently reflects actual conditions that spacers subside relative to the optical functional layer to be capable of varying a thickness of a driving liquid crystal layer.

From above-mentioned reasons, an optical element that, by sufficiently reflecting actual conditions of a liquid crystal display device, can effectively reduce fear that a thickness of a driving liquid crystal layer unexpectedly varies and thereby can maintain the thickness substantially constant and a liquid crystal display device where the optical element is incorporated are in demand.

SUMMARY OF THE INVENTION

The present invention intends to provide, in an optical element capable of being incorporated in a liquid crystal display device, an optical element provided with a birefringent layer obtained by aligning and polymerizing polymerizable liquid crystal molecules, wherein, while sufficiently reflecting actual conditions of a liquid crystal display device, fear that a thickness of a driving liquid crystal layer may unexpectedly vary can be reduced, a method of producing the same, a liquid crystal cell that incorporates such an optical element and a liquid crystal display device.

The invention is (1) an optical element that includes: a light-transmitting base material; and a birefringent layer comprising of aligned and polymerized liquid crystal molecules and having a value of indentation depth of 6% or less relative to a thickness of the birefringent layer, wherein said value is measured under conditions where a cylindrical indenter having a diameter of 30 (μm) is applied at a load of 10 mN/sec up to the maximum load of 400 mN.

(2) The optical element of the (1), wherein a birefringent layer is formed by heating the aligned and polymerized liquid crystal molecules at a temperature atmosphere in the range of 150° C. or more and 260° C. or less.

(3) The optical element of the (1), wherein a birefringent layer is comprised of homeotropically aligned and polymerized liquid crystal molecules.

(4) The optical element of the (1), wherein a birefringent layer is formed in such a manner that a liquid crystal composition containing liquid crystal molecules having a polymerizable functional group is coated on a base material to form a coating film for forming a birefringent layer, prescribed alignment is imparted to the liquid crystal molecules contained in the coating film for forming a birefringent layer and active radiation is illuminated on the coating film for forming a birefringent layer to polymerize liquid crystal molecules.

(5) The optical element of the (1), wherein a colored layer in which light-transmitting color patterns are arranged is further arranged.

(6) A liquid crystal cell that includes: a driving liquid crystal layer formed by encapsulating a liquid crystal material between a display side substrate and a driving liquid crystal side substrate that faces the display side substrate, wherein the optical element of the (1) is incorporated in the display side substrate so as to arrange a birefringent layer between a base material and the driving liquid crystal layer.

(7) A liquid crystal display device includes the liquid crystal cell of the (6) sandwiched between two polarization plates in a thickness direction of the liquid crystal cell.

(8) A method of producing an optical element includes coating a liquid crystal composition containing liquid crystal molecules having a polymerizable functional group on a base material to form a coating film for forming a birefringent layer; imparting predetermined alignment properties to liquid crystal molecules contained in the coating film for forming a birefringent layer; illuminating active radiation on the coating film for forming a birefringent layer to polymerize the liquid crystal molecules; and heating the coating film for forming a birefringent layer in a temperature atmosphere from 150° C. to 260° C. to form a birefringent layer, wherein a value of indentation depth measured under conditions where a cylindrical indenter having a diameter of 30 (μm) is used to apply a load of 10 mN/sec up to the maximum load of 400 mN is 6% or less relative to a thickness of the birefringent layer.

According to an optical element of the invention, in a birefringent layer that is an optical functional layer formed on a substrate, a value of an indentation depth measured under the conditions that a cylindrical indenter having a diameter of 30 (μM) is used to apply a load of 10 mN/sec up to the maximum load of 40 mN is 6% or less relative to a value of a thickness of the birefringent layer. That is, the birefringent layer is formed hard so that a ratio (in some cases, referred to as an indentation deformation rate) of a value of the indentation depth to a value of a thickness of the birefringent layer may be 6% or less. Therefore, according to an optical element of the invention, even when a pressing force is externally applied to a liquid crystal cell when a liquid crystal cell is formed with a substrate in which an optical element is incorporated, fear can be reduced that spacers arranged on the birefringent layer that is an optical functional layer subside in the optical functional layer and thereby a thickness of a driving liquid crystal layer is largely varied.

In addition, in the invention, when an indentation depth of an optical element is measured, a cylindrical one is used as an indenter. That is, in the invention, an indentation depth is measured under conditions that more reflect actual conditions of a liquid crystal display device than in a measurement according JIS Z 2244-03 where a quadrilateral tip end is used as an indenter. An indentation deformation rate obtained based on the indentation depth reflects actual conditions of a liquid crystal display device. Accordingly, with the indentation deformation rate as an indicator, an optical element excellent in the hardness and sufficiently reflecting actual conditions of the liquid crystal display device can be effectively obtained. In addition, as an optical element provided with an optical functional layer having an optical compensation function, one that reflects actual conditions of the liquid crystal display device can be obtained.

In the invention, polymerizable liquid crystal molecules that are liquid crystal molecules having a polymerizable functional group are aligned and polymerized, followed by heating to form a birefringent layer, to thereby obtain an optical element having a birefringent layer adequately small in an indentation depth. In particular, a heating operation is applied in the range of 150 to 260° C., to thereby obtain an optical element having a birefringent layer more appropriate in a value of the indentation depth in the invention.

In the invention, an optical element may be provided with a birefringent layer that is formed by homeotropically aligning polymerizable liquid crystal molecules having a polymerizable functional group in a molecular structure followed by polymerizing. When such an optical element is incorporated in a liquid crystal display device, the optical element can be used as one that has an optical compensation function that allows effectively exerting a function of causing birefringence in light transmitting through a driving liquid crystal layer to compensate retardation of light. An optical element having such the birefringent layer allows effectively exerting the function particularly when a liquid crystal display device is in an IPS (In Plane Switching) mode.

In an optical element of the invention, a birefringent layer is formed by polymerizing polymerizable liquid crystal molecules, that is, a polymer structure (liquid crystal polymer) of polymerizable liquid crystal molecules is formed. Accordingly, since the birefringent layer is excellent in the heat resistance and the birefringence characteristics that show the optical characteristics of a birefringent layer are less influenced thermally, the birefringent layer can exert an advantage in that it can be readily used even under an environment that is likely to be relatively high temperature like the inside of a car. Such an advantage is particularly large since, when the polymerizable liquid crystal molecules are crosslinkable and polymerizable liquid crystal molecules, the polymer structure becomes stronger.

Furthermore, in an optical element of the invention, when, with a member that constitutes a liquid crystal panel as a base material, a liquid crystal composition containing liquid crystal molecules having a polymerizable functional group is coated on the base material to form a birefringent layer, a birefringent layer can be laminated and formed directly on a base material. That is, without locating a member such as a film material having a birefringent layer having a function of controlling the retardation (retardation control member) on a base material as a separate one, an optical instrument can be designed. When a retardation control member is separately arranged, an adhesive is necessarily used in order to fix the member. However, according to an optical element obtained according to a producing method of the invention, such the adhesive can be made unnecessary. Accordingly, fear that an adhesive scatters light can be reduced. Still furthermore, according to the invention, since a layer of the adhesive can be made unnecessary, a liquid crystal display device can be made thinner.

When an optical element of the invention is provided with a colored layer and used in a liquid crystal display device, there is no need of preparing a retardation control member separately from a member having a colored layer and adhering.

According to a method of producing an optical element of the invention, an optical element where the hardness of a birefringent layer is specified by an indentation depth can be obtained and an optical element that can sufficiently suppress fear that a spacer subsides in a birefringent layer can be efficiently obtained in accordance with actual conditions of a liquid crystal display device.

DESCRIPTION OF THE PREFERRED EMBODIMENTS

Figure 1:
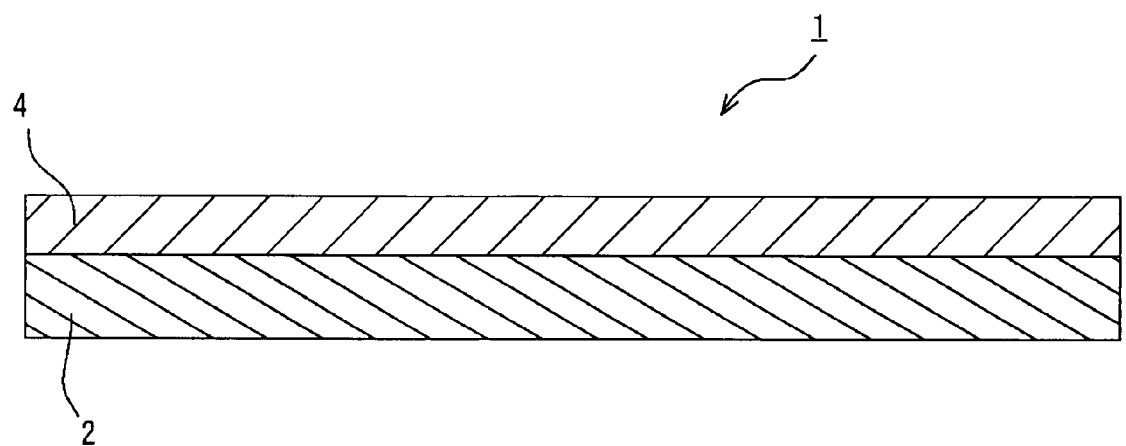
FIG. 1 is a schematic sectional view for explaining a sectional structure of an optical element of the present invention.

An optical element 1 produced in the present invention is constituted by laminating a birefringent layer 4 on a light-transmitting base material 2 (FIG. 1).

The base material 2 is made of a light-transmitting base material forming material and the base material forming material may be constituted of a single layer or in a multilayer by laminating a plurality of kinds of base material forming materials. The base material 2 may be partially provided with a light-shielding region and the like. The optical transmittance of the base material 2 can be appropriately selected.

Furthermore, the base material forming material is preferably formed so as to be optically isotropic. As the base material forming material, other than a glass substrate, planar bodies made of various materials can be appropriately selected. Specifically, examples of the base material forming materials include plastic substrates made of polycarbonate, polymethyl methacrylate, polyethylene terephthalate and triacetyl cellulose; and films made of polyether sulfone, polysulfone, polypropylene, polyimide, polyamide imide and polyether ketone. When an optical element is used for use in liquid crystal displays, the substrate forming material is preferably made of alkali-free glass. Furthermore, available examples of a film used as a base material forming material include a mono-axially or bi-axially stretched film, and also a triacetyl cellulose (TAC) film having retardation inside of the film material.

On the base material 2 further arrangeable are layer structures, for example, members such as a reflective plate that reflects light and a polarization plate, an alignment film such as a horizontal alignment film or a vertical alignment film and a colored layer that transmits visible light having an wavelength in a prescribed range of light propagating in a thickness direction as mentioned below. These may be arranged not only over an entire surface of the base material 2 but also partially thereon.

The birefringent layer 4 is a layer having a function (optical function) of causing birefringence of light. When a xyz space is assumed with a z axis assigned to a thickness direction of the birefringent layer 4 and a x axis and a y axis set mutually orthogonal so as to vertically intersect with a z axis at one point, the refractive indexes in a x axis, a y axis and a z axis are expressed by nx, ny and nz. In this case, an example of the birefringent layer 4 is a layer where any one of nx, ny and nz is larger or smaller than others. For example, the birefringent layer 4, when the refractive indexes thereof satisfy nx>ny=nz or ny>nx=nz, works as a so-called [+A plate] (positive A plate), when the refractive indexes satisfy nx=ny>nz, works as a so-called [−C plate] (negative C plate), and, when the refractive indexes satisfy nx=ny<nz, works as a so-called [+C plate](positive C plate).

The birefringent layer 4 is formed with liquid crystal molecules aligned in a particular direction. The liquid crystal molecule has an optical axis corresponding to a molecular structure thereof and the birefringence characteristics determined by a state of the optical axis. When the liquid crystal molecules are aligned in a particular direction and fixed, a layer structure having the birefringence characteristics corresponding to the alignment state can be formed. Specifically, so-called [+A plate], [−C plate], and [+C plate] can be constituted.

Liquid crystal molecules that constitute the birefringent layer 4 preferably have its birefringence Δn substantially in the range of 0.03 to 0.20 and more preferably have its birefringence Δn substantially in the range of 0.05 to 0.15.

Furthermore, the birefringent layer 4 forms a polymer structure obtained by polymerizing liquid crystal molecules having a polymerizable functional group (referred to as polymerizable liquid crystal molecules) in a molecular structure.

The polymerizable liquid crystal molecule preferably has an unsaturated double bond as a polymerizable functional group in a structure of the liquid crystal molecule. Furthermore, from the heat resistance, as the polymerizable liquid crystal molecule more preferably used is a polymerizable liquid crystal molecule that can cause a crosslinking polymerization in a liquid crystal phase state (crosslinkable and polymerizable liquid crystal molecule or crosslinkable liquid crystal molecule). As the crosslinkable and polymerizable liquid crystal molecule preferably used is one having an unsaturated double bond at both terminals of a molecular structure (one having two or more unsaturated double bonds). When the birefringent layer 4 is formed with the crosslinkable and polymerizable liquid crystal molecules, the birefringent layer 4 is provided with a crosslinked polymer structure obtained by mutually crosslinking the crosslinkable and polymerizable liquid molecules.

Examples of the crosslinkable liquid crystal monomer that is used in a liquid crystal composition of the invention include nematic liquid crystal molecules having the crosslinkability (crosslinkable nematic liquid crystal molecules). Examples of the crosslinkable nematic liquid crystal molecule include a monomer, oligomer and a polymer each of which has at least one polymerizable group such as a (meth)acryloyl group, an epoxy group, an oxetane group or an isocynate group in a molecule. Furthermore, more specific examples of such a crosslinkable liquid crystal molecule include one kind of compounds expressed by a formula (1) shown by [Chem 1] below (compound (I)), one kind of compounds expressed by a formula (2) shown by [Chem 2] below (compound (II)), or a mixture of at least two kinds thereof, one kind of compounds expressed by [Chem 3] and [Chem 4] below (compound (III)) or a mixture of at least two kinds thereof, or a mixture thereof.

[Chem 1]

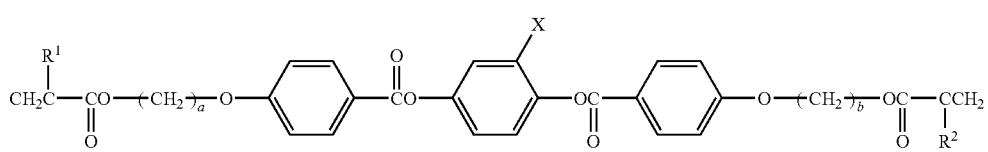

(1)

[Chem 2]

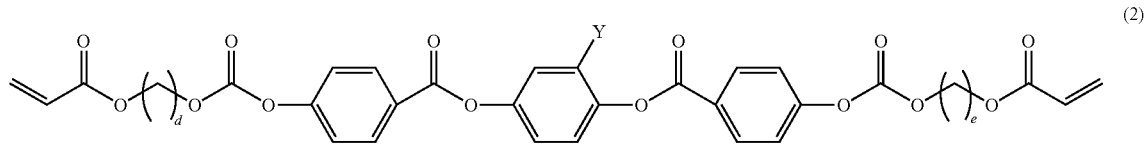

(2)

[Chem 3]

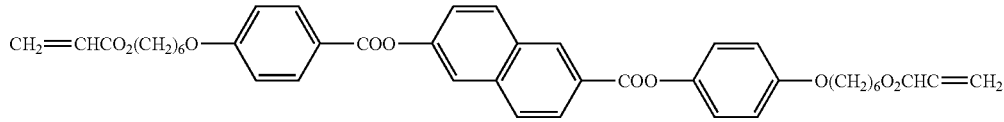

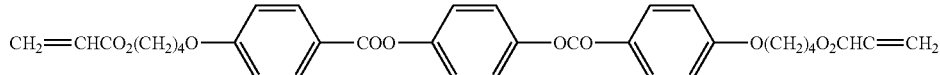

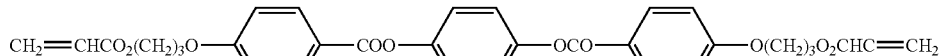

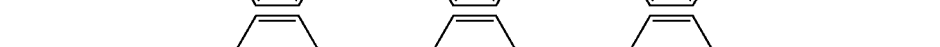

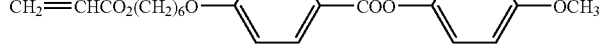

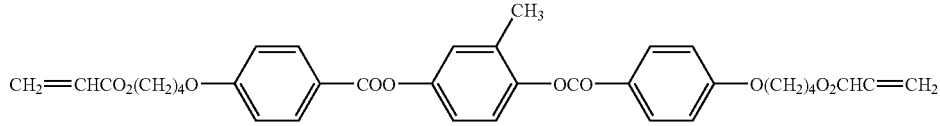

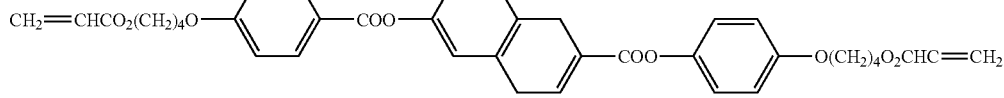

-continued

[Chem 4]

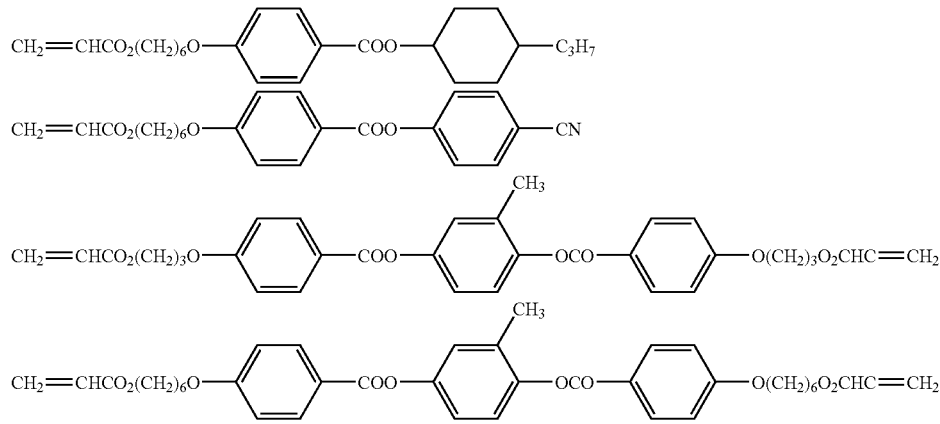

In the formula (1) shown by [Chem 1], $R^1$ and $R^2$, respectively, express hydrogen or a methyl group. However, in order to make a range where the crosslinkable liquid crystal molecules show a liquid crystal phase broader, at least one of $R^1$ and $R^2$ is preferably hydrogen and both $R^1$ and $R^2$ are more preferably hydrogen. Furthermore, both of X in the formula (1) and Y in the formula (2) may be any one of hydrogen, chlorine, bromine, iodine, an alkyl group having 1 through 4 carbon atoms, a methoxy group, a cyano group or a nitro group but preferably chlorine or a methyl group. Still furthermore, a and b each showing a chain length of an alkylene group between a (meth)acryloyloxy group at both terminals of a molecular chain of the formula (1) and an aromatic ring, and d and e in the formula (2), may be individually and independently an arbitrary integer in the range of 1 through 12, but preferably in the range of 4 through 10 and more preferably in the range of 6 through 9. Compounds (I) expressed by the formula (1) where a=b=0 or compounds (II) expressed by the formula (2) where d=e=0 are less stable and likely to be hydrolyzed and the compounds (I) or (II) themselves are high in the crystallinity. Furthermore, the compounds (I) of the formula (1) or compounds (II) of the formula (2) where a and b or d and e, respectively, are 13 or more are low in the isotropic phase transition temperature (TI). From the reason, in all of the compounds, a temperature range where the liquid crystal properties are stably exhibited (a temperature range where a liquid crystal phase can be maintained) becomes narrower, resulting in being unfavorable to use in liquid crystal composition of the invention.

As the crosslinkable liquid crystal molecules blended in a liquid crystal composition, monomers of liquid crystals having the polymerizability (polymerizable liquid crystals) are exemplified in the [Chem 1], [Chem 2], [Chem 3] and [Chem 4]. However, oligomers of polymerizable liquid crystal, polymer of polymerizable liquid crystal or the like can be also used. Regarding these as well, known ones such as oligomers or polymers such as the [Chem 1], [Chem 2], [Chem 3] and [Chem 4] can be appropriately selected and used.

In the birefringent layer 4, a polymerization degree of a liquid crystal molecule (crosslinking polymerization degree in the case of the crosslinkable and polymerizable liquid crystal molecule) is preferably substantially 80 or more and more preferably substantially 90 or more. When the polymerization degree of liquid crystal molecules that constitute the birefringent layer 4 is smaller than 80, there is fear that uniform alignment properties may not be sufficiently maintained. The polymerization degree and crosslinking polymerization degree express ratios consumed in a polymerization reaction of liquid crystal molecules of polymerizable functional groups of liquid crystal molecules.

By use of the liquid crystal molecules such as one mentioned above, the birefringent layer 4 is formed in accordance with the function thereof as shown below.

When the birefringent layer 4 is a layer that has an optical compensation function as the [+A plate], the birefringent layer 4 is formed by aligning positive dielectric constant anisotropic liquid crystal molecules and fixing so that optical axes thereof may be in parallel with an x-y plane including an x-axis and a y-axis.

More specifically, a resin material that constitutes a resin film (horizontal alignment film) capable of horizontally aligning liquid crystal molecules is prepared and coated on a surface of a base material forming material to form a coating film for forming horizontal alignment film, a surface of the coating film for forming a horizontal alignment film is rubbed or optically processed to align to obtain a horizontal alignment film and the base material forming material and the horizontal alignment film form a base material 2. On the other hand, liquid crystal molecules are dissolved in a solvent to prepare a liquid crystal composition, the liquid crystal composition is coated on the horizontal alignment film of the previously formed base material 2 to form a coating film, and liquid crystal molecules contained in the coating film are homogeneously aligned and polymerized to fix the liquid crystal molecules in a homogeneously aligned state to render the coating film a birefringent layer 4. Thus, a birefringent layer 4 as a [+A plate] can be obtained. The liquid crystal molecules can be polymerized by illuminating active radiation such as light or UV-rays in a photosensitive wavelength of the liquid crystal molecule.

When a birefringent layer 4 is a layer having an optical compensation function as a [+C plate], the birefringent layer 4 can be formed by aligning and fixing negative dielectric constant anisotropic liquid crystal molecules so that an optical axis thereof may direct to a z axis direction in the above-assumed xyz space.

Specifically, a birefringent layer 4 can be formed as follows.

In the beginning, the above-mentioned liquid crystal molecules that constitute a birefringent layer 4 and a solvent are blended to prepare a liquid crystal composition. As needs arise, an additive containing an alignment aid for vertically aligning the liquid crystal molecules (in some cases, called as vertical alignment aid) may be appropriately added to the liquid crystal composition.

The solvent that is used to prepare the liquid crystal composition, as far as it can dissolve liquid crystal molecules that constitute a birefringent layer 4, is not particularly restricted. Specific available examples thereof include at least one kind of hydrocarbons such as benzene, toluene, xylene, n-butyl benzene, diethyl benzene and tetralin; ethers such as methoxybenzene, 1,2-dimethoxybenzene and diethylene glycol dimethyl ether; ketones such as acetone, methyl ethyl ketone, methyl isobutyl ketone, cyclohexanone and 2,4-pentanedione; esters such as ethyl acetate, ethylene glycol monomethyl ether acetate, propylene glycol monomethyl ether acetate, propylene glycol monoethyl ether acetate and γ-butylolactone; amide solvents such as 2-pyrohlidone, N-methyl-2-pyrohlidone, dimethyl formamide and dimethyl acetamide; halogen-based solvents such as chloroform, dichloromethane, carbon tetrachloride, dichloroethane, tetrachloroethane, trichloroethylene, tetrachloroethylene, chlorobenzene and orthodichlorobenzene; alcohols such as t-butyl alcohol, diacetone alcohol, glycerin, monoacetin, ethylene glycol, triethyleneglycol, hexylene glycol, ethylene glycol monomethyl ether, ethyl cellosolve and butyl cellosolve; and phenols such as phenol and parachlorophenol. When, with only one kind of solvent, the solubility of the blended components such as the crosslinkable liquid crystal molecules is insufficient or a material that is a counterpart of coating when the liquid crystal composition is coated is likely to be damaged, at least two kinds of solvents are mixed and used, whereby the inconveniences can be avoided. Among the solvents mentioned above, ones that can be preferably used as a single solvent include hydrocarbon-based solvents and glycol monoether acetate-based solvents and ones that can be preferably used as a mixture solvent include mixed solvents of ethers or ketones and glycols. A concentration of blending component of the liquid crystal composition solution, though different depending on the solubility of the components used in the liquid crystal composition to a solvent and a layer thickness desired for the retardation layer, is usually in the range of 1 to 60% by weight and preferably in the range of 3 to 40% by weight.

Specific examples of the vertical alignment aid contained in liquid crystal composition include polyimide, a surfactant and a coupling agent.

When polyimide is used as the vertical alignment aid, polyimide having a long chain alkyl group is preferred since a thickness of the birefringent layer 4 formed in an optical element can be selected in a wide range. When the vertical alignment aid is polyimide, as the polyimide, specifically, SE-7511 and SE-1211 (trade name, produced by Nissan Chemical Industries Ltd.) or JALS-2021-R2 (trade name, produced by JSR Corporation) can be exemplified.

When a surfactant is used as the vertical alignment aid, any surfactant can be used as far as the surfactant can homeotropically align polymerizable liquid crystal molecules. However, when a birefringent layer is formed, the liquid crystal molecules have to be heated to a transition temperature to a liquid crystal phase. Therefore, the liquid crystal molecules are demanded to be heat resistant to an extent that cannot be decomposed even at the transition temperature to a liquid crystal phase. Furthermore, when a birefringent layer 4 is formed, in some cases, liquid crystal molecules are dissolved in an organic solvent; accordingly, in such a case, the affinity with the organic solvent that dissolves the liquid crystal molecules is demanded to be excellent. As far as such demands are satisfied, the surfactant, without restricting to the kinds such as nonionic type, cationic type or anionic type, may be one kind thereof or a plurality of kinds of the surfactants may be used in combination.

Regarding the surfactant, in order to homeotropically align polymerizable liquid crystal molecules even when a thickness of a birefringent layer is increased, the surfactant is preferably one strong in the water-repellency or oil-repellency. Examples of such a surfactant include (i) lecithin, (ii) octadecyl dimethyl (3-trimethoxysilylpropyl)ammoniumchloride, (iii) hexadecylamine, (iv) ADEKAMINE 4DAC-85 (trade name of surfactant, produced by Asahi Denka Kogyo Co., Ltd.), (v) DRYPON 600E (trade name of a surfactant, produced by NICCA CHEMICAL), (vi) DRYPON Z-7 (trade name of a surfactant, produced by NICCA CHEMICAL Co., Ltd.) and (vii) NK Guard NDN-7E (trade name of a surfactant, produced by NICCA CHEMICAL).

When a coupling agent is used as the vertical alignment aid, specific examples of the coupling agents include silane coupling agents obtained by hydrolyzing silane compounds such as n-octyltrimethoxysilane, n-octyltriethoxysilane, decyltrimethoxysilane, decyltriethoxysilane, n-dodecyltrimethoxysilane, n-dodecyltriethoxysilane, octadecyltrimethoxysilane and octadecyltriethoxysilane, and fluorine-based silane coupling agents. A plurality of kinds of the coupling agents may be selected and added to the liquid crystal composition.

Furthermore, to the liquid crystal composition, as needs arise, a photopolymerization initiator or a sensitizer is added.

Examples of the photopolymerization initiators include benzyl (or bibenzoyl), benzoin isobutyl ether, benzoin isopropyl ether, benzophenone, benzoylbenzoic acid, methyl benzoyl benzoate, 4-benzoyl-4'-methyldiphenylsulfide, benzyl methyl ketal, dimethylaminomethyl benzoate, 2-n-butoxyethyl-4-dimethylamino benzoate, isoamyl p-dimethylamino benzoate, 3,3'-dimethyl-4-methoxybenzophenone, methylobenzoyl formate, 2-methyl-1-(4-(methylthio)phenyl)-2-morpholinopropane-1-one, 2-benzyl-2-dimethylamino-1-(4-morpholinophenyl)-butane-1-one, 1-(4-dodecylphenyl)-2-hydroxy-2-methylpropane-1-one, 1-hydroxycyclohexylphenylketone, 2-hydroxy-2-methyl-1-phenylpropane-1-one, 1-(4-isopropylphenyl)-2-hydroxy-2-methylpropane-1-one, 2-chlorothioxanthone, 2,4-diethylthioxanthone, 2,4-diisopropylthioxanthone, 2,4-dimethylthioxanthone, isopropylthioxanthone and 1-chloro-4-propoxythioxanthone.

When a photopolymerization initiator is blended in the liquid crystal composition, a blending amount of the photopolymerization initiator is in the range of 0.01 to 10% by weight. The blending amount of the photopolymerization initiator is preferable to be an extent that does not disturb the alignment of the polymerizable liquid crystal molecules as far as possible. When this is taken into consideration, the blending amount thereof is preferably in the range of 0.1 to 7% by weight and more preferably in the range of 0.5 to 5% by weight.

When a sensitizer is blended in the liquid crystal composition, a blending amount of the sensitizer can be appropriately selected from the range that does not largely disturb the alignment of the polymerizable liquid crystal molecules and specifically selected from a range of 0.01 to 1% by weight. The photopolymerization initiators and sensitizers, respectively, can be used singularly or in a combination of at least two kinds thereof.

After the liquid crystal composition is prepared like this, the liquid crystal composition is coated on the base material 2 to prepare a coating film for forming a birefringent layer.

Available examples of a method of coating the liquid crystal composition include various kinds of printing methods such as a die coating method, a bar coating method, a slide coating method and a roll coating method, and a spin coating method.

Next, polymerizable liquid crystal molecules contained in the coating film for forming a birefringent layer prepared by coating on a surface of the base material 2 are homeotropically aligned as shown below for example. That is, the coating film for forming a birefringent layer is heated to a temperature (liquid crystal phase temperature) where the liquid crystal molecules contained in the coating film (coating film for forming a birefringent layer) may be a liquid crystal phase or more and a temperature less than a temperature where the liquid crystal molecules contained in the coating film may be an isotropic phase (liquid phase) to homeotropically align the liquid crystal molecules. At this time, heating means of the coating film for forming a birefringent layer are not particularly restricted. That is, a substrate having the coating film for forming a birefringent layer formed thereon may be placed under a heating atmosphere or infrared rays may be illuminated on the coating film for forming a birefringent layer to heat.

The polymerizable liquid crystal molecules can be homeotropically aligned by use of, other than the above-mentioned methods, a method of drying the coating film for forming a birefringent layer under reduced pressure or a method where, an electric field or a magnetic field is applied from a predetermined direction to the coating film for forming a birefringent layer, depending on the polymerizable liquid crystal molecules contained in the coating film for forming a birefringent layer and a state of the coating film.

In the case of the coating film for forming a birefringent layer being dried under reduced pressure to homeotropically align the liquid crystal molecules, since, when a reduced pressure state is realized, the coating film for forming a birefringent layer can be supercooled and the coating film can be further cooled to room temperature, with a state where the liquid crystal molecules in the coating film for forming a birefringent layer are homeotropically aligned maintained. Thereby, until the liquid crystal molecules are polymerized, a state where the liquid crystal molecules are homeotropically aligned can be efficiently maintained.

After a state where the liquid crystal molecules are homeotropically aligned is formed in such a coating film for forming a birefringent layer, the liquid crystal molecules each other can be polymerized (crosslinked and polymerized when the liquid crystal molecules are crosslinkable and polymerizable liquid crystal molecules).

The polymerization is forwarded when active radiation such as light having a photosensitive wavelength of the liquid crystal molecule is illuminated on the coating film for forming a birefringent layer (referred to as an A method). At this time, a wavelength of light illuminated on the coating film for forming a birefringent layer is appropriately selected depending on the kind of the liquid crystal molecule contained in the coating film. Light that is illuminated on the coating film for forming a birefringent layer, without restricting to monochromatic light, may be light having a definite wavelength range including a photosensitive wavelength of the liquid crystal molecule.

Furthermore, the polymerization of the liquid crystal molecules may be carried out according to the following method (referred to as a method B). In this method, under heating the coating film for forming a birefringent layer to a liquid crystal phase temperature, active radiation such as light having a photosensitive wavelength of the liquid crystal molecule is illuminated on the coating film to partially forward the polymerization (partially crosslinking and polymerizing step) to partially polymerize. Then, the coating film for forming a birefringent layer is cooled to a temperature where the liquid crystal molecules become a liquid crystalline phase (Tc). Further, in this state, active radiation such as light having a photosensitive wavelength is illuminated to the coating film for forming a birefringent layer to bring the polymerization forward to completion. The temperature Tc above is a temperature where, in a coating film for forming a birefringent layer before the polymerization is forwarded, the liquid crystal molecules become a crystalline phase.

In a partial polymerization step, even when the coating film for forming a birefringent layer is cooled to a temperature Tc, the polymerization is forwarded to an extent where the homeotropic alignment properties of the liquid crystal molecules contained in the coating film can be maintained. Accordingly, an extent of a progress of the polymerization in the partial crosslinking step is appropriately selected depending on the kind of the liquid crystal molecule contained in the coating film for forming a birefringent layer and a film thickness of the coating film. In the partial polymerization, the polymerization is preferably forwarded until the crosslinking degree of the liquid crystal molecules becomes 5 to 50.

The methods A and B can be carried out, without restricting to under an air atmosphere, under an inert gas atmosphere as well.

In the birefringent layer 4, regarding tilt angles of the individual liquid crystal molecules constituting the polymer structure (in the case of the liquid crystal molecules being crosslinkable and polymerizable liquid crystal molecules, a crosslinkable polymer structure), tilt angles of liquid crystal molecules present at positions different in a thickness direction of the birefringent layer 4 are preferred to be substantially same each other. Furthermore, in the birefringent layer 4, the tilt angles of the liquid crystal molecules present at positions different in a plane direction of the birefringent layer 4 are also preferred to be mutually substantially same. In this case, the tilt angles of the respective liquid crystal molecules contained in the birefringent layer 4 become substantially same; accordingly, the birefringent layer 4 becomes less uneven of the optical characteristics thereof.

The birefringent layer 4 is constituted so that a magnitude of the retardation in an in-plane direction may be a small value, specifically, a magnitude of the retardation is 1 nm or less. Here, in the birefringent layer 4, the more evenly homeotropically aligned the liquid crystal molecules are, the smaller a magnitude of the retardation is. In this connection, from the viewpoint of obtaining a birefringent layer 4 where liquid crystal molecules are evenly homeotropically aligned, the magnitude of the retardation is preferably 1 nm or less, more preferably 0.1 nm or less and ideally zero.

The retardation is an optical path difference between ordinary light and extraordinary light generated to incident light, and the magnitude of the retardation, with the refractive index of ordinary light no and the refractive index of extraordinary light ne, is given as a product of the birefringence $\Delta n$ (difference between no and ne) and d (thickness of the birefringent layer 4) and shows optical characteristics.

A thickness of the birefringent layer 4 is preferably appropriately selected in a range capable of homeotropically aligning the liquid crystal molecules, specifically, in a range where the retardation in an in-plane direction may be 1 nm or less and more preferably in a range where the retardation becomes substantially 0.1 nm or less.

In the case of the birefringent layer 4 being a layer that functions as a [+C plate], when, with one in which on a base material forming material a vertical alignment film is formed in advance as a base material 2, a birefringent layer 4 is formed on the vertical alignment film of the base material 2, an optical axis of the birefringent layer 4 can be preferably more directed toward a z axis direction.

The vertical alignment film can be formed in such a manner that a vertical alignment film composition solution containing polyimide is coated on a base material 2 by means of a flexo printing method or a spin coating method to prepare a coating film for forming a vertical alignment film forming and the coating film is cured. Specific examples of a vertical alignment film composition solution containing polyimide include SE-7511 and SE-1211 (trade name, produced by Nissan Chemical Industries Ltd.) and JALS-2021-R2 (trade name, produced by JSR Corporation).

A film thickness of the vertical alignment film is preferably substantially in the range of 0.01 to 1 μm. When the film thickness of the vertical alignment film is thinner than 0.01 μm, there is fear that the liquid crystal molecules are homeotropically aligned with difficulty. Furthermore, when the film thickness of the vertical alignment film 3 is thicker than 1 μm, fear that an extent of scattering of light due to the vertical alignment film becomes larger to deteriorate the optical transmittance of the optical element becomes larger.

When the vertical alignment film is high in the water-repellency and oil-repellency, before a liquid crystal composition is coated on the vertical alignment film to form a birefringent layer 4, it is well that UV cleaning or plasma treatment is applied within a range capable of homeotropically aligning liquid crystal molecules to in advance heighten the wettability of a surface of the vertical alignment film on which a liquid crystal composition is being coated.

In the case of the birefringent layer 4 being a layer having an optical compensation function as the [−C plate], the birefringent layer 4 can be formed by aligning and fixing negative dielectric constant anisotropic liquid crystal molecules so that optical axes thereof may direct toward a z axis direction. In addition, the birefringent layer 4 having an optical compensation function as a [−C plate] may be formed as follows. That is, by use of a liquid crystal composition containing liquid crystal molecules such as crosslinkable nematic liquid crystal when the [+C plate] is prepared, thereto a chiral agent is added to prepare a liquid crystal composition (in some cases, referred to as a chiral agent-containing liquid crystal composition) that imparts the cholesteric regularity to the polymerizable liquid crystal molecules to render to a chiral nematic liquid crystal, and the chiral agent containing liquid crystal composition may be used to form the birefringent layer 4.

When the birefringent layer 4 is formed with a chiral agent-containing liquid crystal composition, specifically, the liquid crystal molecules such as mentioned above, a chiral agent, a photopolymerization initiator and a solvent are mixed to prepare a liquid crystal composition solution, the liquid crystal composition solution is coated on a surface of the base material 2 to prepare a coating film for forming a birefringent layer, the liquid crystal molecules contained in the coating film are polymerized and baked, to thereby form a birefringent layer 4 provided with an optical function as the [−C plate]. The liquid crystal molecules can be polymerized by illuminating active radiation to the coating film similarly to the case of the [+A plate] and [+C plate].

The chiral agent is preferred to be a low molecular weight compound having an optically active site in a molecule with a molecular weight of 1500 or less. Specifically, as the chiral agent, compounds such as shown in [Chem 5] below can be exemplified. However, as far as it has the compatibility in a solution state or a melt state with compounds (I) shown by [Chem 1], compounds (II) shown by [Chem 2], or compounds (III) shown by [Chem 3] and [Chem 4] and can induce a spiral pitch without damaging the liquid crystal properties of crosslinkable nematic liquid crystal molecules, the chiral agent is not restricted to compounds shown by [Chem 5]. However, as the chiral agent, ones having a polymerizable functional group at both terminals in a molecular structure are preferred from the viewpoint of obtaining a birefringent layer 4 excellent in the heat resistance and it is important that the chiral agent is a compound having an optically active site in a molecular structure.

When such the chiral agent is blended in a liquid crystal composition that contains a compound (I) shown by [Chem 1], a compound (II) shown by [Chem 2] or a compound (III) shown by [Chem 3] and [Chem 4] as polymerizable liquid crystal molecules, at forming the birefringent layer 4 by use of the liquid crystal composition, a spiral pitch can be induced with positive mono-axial nematic regularity to polymerizable liquid crystal molecules contained in the birefringent layer 4.

The chiral agent is added to spirally align the liquid crystal molecules. However, when the liquid crystal molecule takes a spiral pitch in a near UV region, a particular reflection color is generated owing to selective reflection phenomenon; accordingly, a blending amount of the chiral agent is preferably set to an amount capable of obtaining a spiral pitch that causes the selective reflection phenomenon in a UV region.

Examples of the chiral agents include compounds having at least one asymmetric carbon, compounds having an asymmetric point on a hetero-atom such as chiral amine and chiral sulfoxide, or compounds having the axial asymmetry such as cumulene and binaphthol. However, depending on the property of a selected chiral agent, the nematic regularity may be destroyed and the aligning property may be deteriorated. Furthermore, in the case of a non-polymerizable chiral agent, the curability due to the polymerization of the polymerizable liquid crystal is deteriorated and the electrical reliability of the birefringence functional layer formed with the liquid crystal composition may be deteriorated. Still furthermore, when a chiral agent having an optically active site is used in a large quantity, the cost is raised. Accordingly, as the chiral agent, a chiral agent having a large effect in inducing a spiral pitch in alignment of liquid crystal molecules at a small quantity thereof is preferably selected. More specifically, for example, a commercially available one such as S-811 (trade name, produced by Merck Co., Ltd.) can be used.

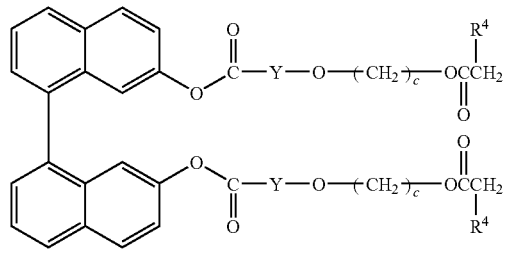

(3)

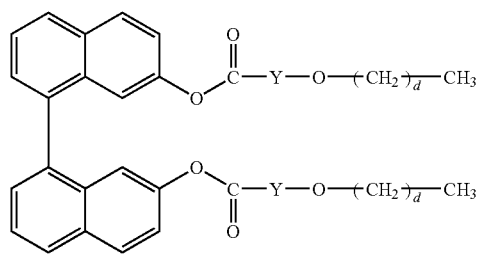

(4)

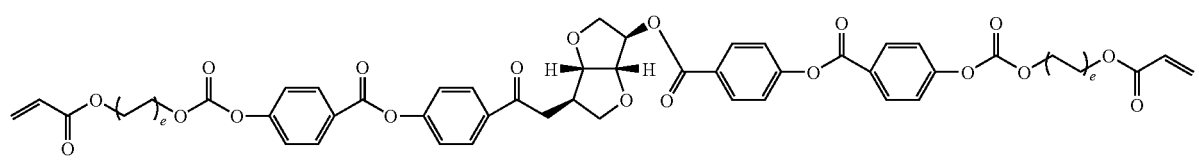

(5)

e=an integer from 2 to 5

In formulas (3) through (5), $R^4$ expresses hydrogen or a methyl group, and Y is an arbitrary one of (i) through (xxiv) shown in [Chem 6] and [Chem 7], particularly preferably, any one of (i), (ii), (iii), (v) and (vii). Furthermore, c and d that express a repetition number of alkylene group are further preferred to be respectively and separately in the range of 2 through 12. A compound in which a value of c or d is less than 2 lacks in the stability, is susceptible to hydrolysis and is high in the crystallinity. On the other hand, a compound where a value of c or d is 13 or more is low in the melting temperature (Tm). Accordingly, when a compound of which value of c or d is deviated from the above-mentioned preferred range is used as a chiral agent, the compatibility with crosslinkable and polymerizable liquid crystal molecules exemplified in compounds (I) or compounds (II) is deteriorated to be likely to cause a phase separation or the like depending on a concentration.

[Chem 6]

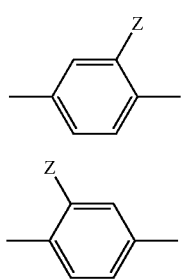

(i)

(ii)

[Chem 7]

-continued

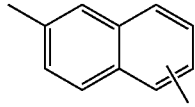 (iii)

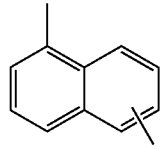 (iv)

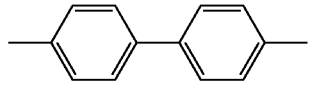 (v)

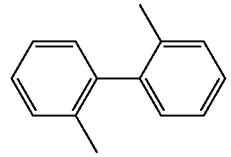 (vi)

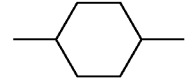 (vii)

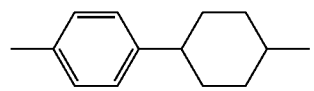 (viii)

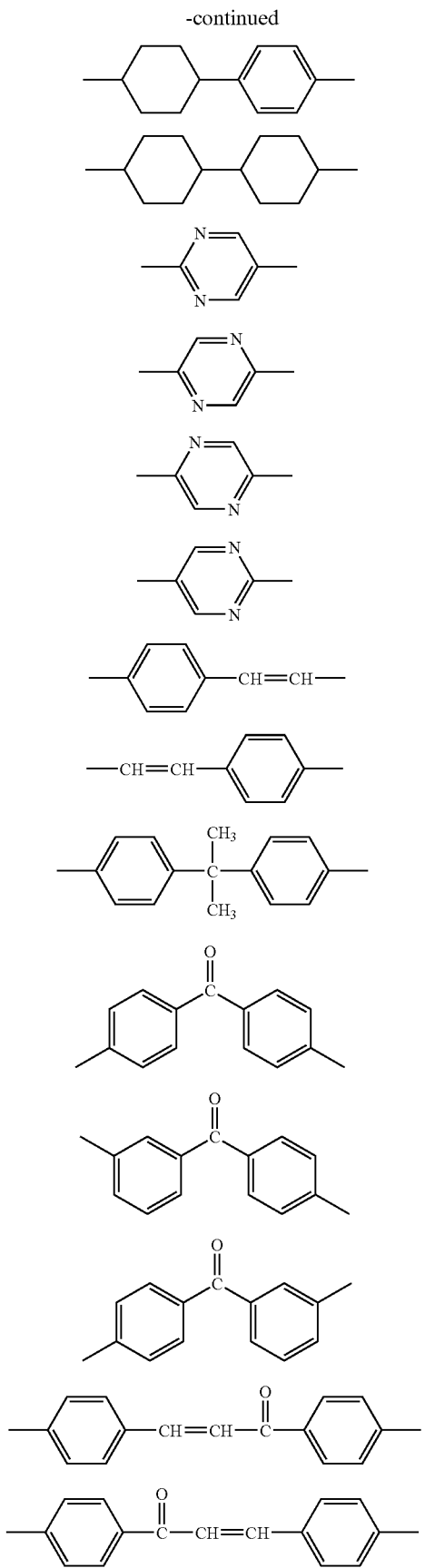

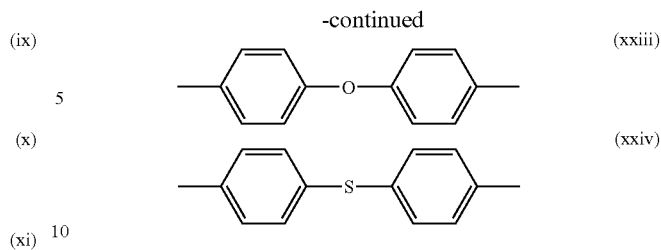

In the invention, in the birefringent layer 4, a value of indentation depth is 6% or less relative to a value of a thickness of the birefringent layer and, when the adhesiveness between the birefringent layer 4 and the substrate is considered, a value of the indentation depth is preferably 0.3% or more and 6% or less. The value of the indentation depth is a value that reflects the hardness of the birefringent layer. In the case of the value of the indentation depth being larger than a value corresponding to 6% relative to a thickness of the birefringent layer, when a liquid crystal cell is formed by use of a substrate that incorporates an optical element, upon externally applying a pressing force on the liquid crystal cell, a spacer that is arranged on the birefringent layer that is an optical functional layer subsides in an optical functional layer to cause a large variation in a thickness of a driving liquid crystal layer, whereby unevenness is excessively generated in a display image. When the value of the indentation depth is less than 0.3% relative to a value of a thickness of the birefringent layer, although it is a very hard film, the adhesiveness between the birefringent layer 4 and the substrate that is a base layer thereof may be deteriorated.

Here, an indentation depth in the invention is a value of indentation depth, which is obtained by measuring according to a measurement method and under measurement conditions below. That is, to a test piece (dimension; width 10 cm×length 10 cm×thickness 701.5 µm (a thickness of a birefringent layer 4: 1.5 µm and a thickness of a substrate: 700 µm)) of an optical element 1, by use of a surface film physical property tester (film hardness meter, such as a Fischer's scope H100VP-HCU X-Y PROG (trade name, produced by H. FISCHER Corp.)), a load is applied with a cylindrical diamond indenter having a diameter of 30 µm as shown below. The load is applied to the test piece at 10 mN/sec for 40 sec while gradually increasing to the maximum load of 400 mN followed by maintaining there for 5 sec. Subsequently, the load is conversely reduced at 10 mN/sec until the load becomes 0 mN after 40 sec, followed by maintaining there for 5 sec again. The maximum indentation depth (D) of the indentation depth generated in the birefringent layer 4 at this time is an indentation depth of the invention. The indentation depth usually corresponds to the maximum depth of the indentation depth when the test piece is held for 5 sec at the last. Furthermore, a value of an indentation depth showing an extent of an indentation depth by a numerical value is divided by a value (r) of a thickness of the birefringent layer 4 (in the example of the foregoing test piece, r=1.5 [µm]), followed by multiplying by 100 ((D/r)×100). This allows to obtain a value (%) of the indentation depth to a unit thickness of the birefringent layer (indentation deformation rate), as a value showing what a percent ratio is a value of the indentation depth to a value of a thickness of the birefringent layer 4. In the above-mentioned measurement of the indentation depth, as a cylindrical indenter, a Vickers indenter is processed into a cylinder and used.

In the invention, the hardness thereof the birefringent layer 4 is specified by the indentation depth. In this case, in comparison with the case where the Vickers hardness is used to specify, actual conditions of a liquid crystal display device in which an optical element 1 is incorporated can be more reflected.

That is, the relationship between pressing forces (F) that are applied in a thickness direction to a liquid crystal display device in which an optical element 1 is incorporated to actually generate the display unevenness on a screen, indentation depths (W) of the birefringent layer 4, which are measured with a cylindrical indenter, and the Vickers hardness (V) of the birefringent layer 4, which is measured with a quadrilateral indenter, is investigated of a plurality of liquid crystal display devices while differentiating the F value. As the result, the difference of values of F of the liquid crystal display devices approximates (more correlational) the difference of values of W than that of values of V. More specifically, for example, when the liquid crystal display devices are arranged in an ascending order from one small in the F value, the order is more close to the order of values of W than the order of values of V.

An optical element 1 of the invention is produced as shown below.

On a base material 2 of an optical element 1, a liquid crystal composition prepared as shown above in accordance with a birefringent layer 4 having a function (for example, a function as a [+C plate]) appropriately selected corresponding to an object is coated to prepare a coating film for forming a birefringent layer.

Available examples of a method of coating the liquid crystal composition on a surface of the base material 2 include various kinds of printing methods such as a die coating method, a bar coating method, a slide coating method and a roll coating method, a spin coating method, and a combination thereof.

Furthermore, after the liquid crystal composition is coated, the prepared coating film for forming a birefringent layer is further dried. The base material having the liquid crystal composition coated thereon may be dried by, other than carrying out under reduced pressure by drying under reduced pressure, carrying out under atmospheric pressure. Natural drying under atmospheric pressure is preferred, since the alignment properties can be more evenly imparted to the liquid crystal molecules when drying is carried out in this manner.

Subsequently, as for the substrate having a dry coating film for forming a birefringent layer formed thereon, the alignment properties are appropriately imparted to liquid crystal molecules contained in the coating film for forming a birefringent layer, as shown above, followed by polymerizing to render the birefringent layer forming coated layer a birefringent layer 4, whereby an optical element 1 is produced.

The birefringent layer 4, without restricting to the case where it is formed over an entire surface of the base material 2, may be partially formed thereon. As a method of partially forming a birefringent layer 4, for example, a method of forming a pattern on the base material 2 by use of various kinds of printing methods or a photolithography method can be specifically exemplified.

Thus, an optical element 1 in which a birefringent layer 4 is laminated on the base material 2 can be obtained.

The optical element 1 of the invention is specifically described with a case where a birefringent layer 4 that is laminated on the base material 2 is a single layer as an example. However, without restricting thereto, a plurality of birefringent layers 4 may be laminated. In this case, the kind of the birefringent layer, without restricting to one, may be also a plurality of kinds. For example, a birefringent layer 4 may be formed in an optical element 1 by laminating a layer structure having a function of a [+A plate] on the base material 2, followed by laminating further thereon a layer structure having a function of a [+C plate].

In the optical element 1 of the invention, from the viewpoint of improving the hardness of the birefringent layer 4, it is preferred to heat a coating film for forming a birefringent layer (in some cases, referred to as heating after polymerization) after the liquid crystal molecules contained in the coating film for forming a birefringent layer laminated on the base material 2 are polymerized. When the coating film for forming a birefringent layer is heated after polymerization, the base material 2 is necessary to have the heat resistance; accordingly, as the base material forming material that constitutes the base material 2, a glass substrate having the heat resistance can be preferably used.

When a coating film for forming a birefringent layer is heated after polymerization, a heating temperature thereof is in the range of 150 to 260° C. However, from the viewpoint of effectively hardening a birefringent layer 4 after the heating after the polymerization more than before the heating after the polymerization, the heating temperature is preferred to be in the range of 200 to 250° C. A heating time after the polymerization is in the range of 10 to 90 min. However, from the viewpoint same as that of the heating temperature when the heating is applied after the polymerization, the heating time is preferred to be in the range of 20 to 60 min. When the heating temperature exceeds 260° C. or the heating time exceeds 90 min, although the film strength of the coating film for forming a birefringent layer is heightened, the film is yellowed. On the other hand, when the heating temperature is less than 150° C. or the heating temperature is less than 10 min, sufficient strength cannot be obtained. After the heating, a temperature of the coating film for forming a birefringent layer is lowered.

The heating after the polymerization can be specifically carried out in such a manner that a base material having a coating film for forming a birefringent layer formed thereon is introduced in a calcination device such as an oven, followed by calcining in an air environment under atmospheric pressure. Other than the above, a method of illuminating infrared rays can be also used.

Furthermore, when a step of heating is applied after the polymerization, a temperature-up process when the coating film for forming a birefringent layer is heated and a temperature-down process when the temperature is lowered after the heating are preferred to carry out gradually.

In the invention, when the heating is applied after the polymerization, there is an advantage that the indentation depth of the optical element 1 can be made more assuredly 10 or more. Furthermore, the heating after the polymerization is carried out after the polymerization of liquid crystal molecules is carried out by illuminating active radiation; accordingly, there is less fear in that the alignment properties of the liquid crystal molecules are disturbed.

The mechanism why the hardness of the birefringent layer goes up owing to the heating after the polymerization in the invention is not clear. However, following two can be considered. Firstly, it is assumed that, in the illumination of the active radiation, which is usually carried out when the liquid crystal molecules contained in the coating film for forming a birefringent layer are polymerized, polymerizable functional groups that are not used in the polymerization remain partially in the liquid crystal molecules, the polymerizable functional groups are more assuredly consumed in the polymerization owing to the heating after the polymerization to result in more strengthening a polymer structure of the birefringent layer and thereby the hardness of the birefringent layer is also improved. Secondly, it is assumed that only by a step of polymerizing liquid crystal molecules contained in the coating film for forming a birefringent layer, residues of the photopolymerization initiator other than the liquid crystal molecules remain mingled in the birefringent layer, when the residues like this are eliminated by the heating after the polymerization, a polymer structure due to liquid crystal molecules is more stabilized, and thereby the hardness of the birefringent layer is improved. It is assumed that the first and second factors synergistically work to improve the hardness of the birefringent layer 4.

In the optical element of the invention, in order to make a value of the indentation depth smaller (in order to improve the hardness of the birefringent layer 4), other than the above-mentioned method of carrying out the heating after the polymerization, there are (1) a method where, in the step of forming a coating film for forming a birefringent layer, when light such as UV-rays is illuminated for mutually polymerizing crosslinkable liquid crystal molecules, an exposure amount is increased to improve the polymerization degree and (2) a method where polyfunctional polymerizable monomers are added to a liquid crystal composition that constitutes a coating film for forming a birefringent layer to increase crosslinking of the coating film for forming a birefringent layer. However, since the hardness of the birefringent layer 4 can be improved more conveniently than the (1) and (2) methods, the above-mentioned heating after the polymerization is more preferred.

Furthermore, as a method of improving the hardness of the birefringent layer 4, the kind of polymerizable liquid crystal molecules can be selected and carried out, that is, there is a method where liquid crystal molecules that can make the glass transition temperature (Tg) of a liquid crystal polymer obtained after polymerization of liquid crystal molecules be 120° C. or more are selected. When an optical element excellent in the indentation depth is obtained by a method to select the kind of the liquid crystal molecules, the number of the functional groups that the polymerizable liquid crystal molecule has is preferably 5 or less. When the polymerizable liquid crystal molecule having the polymerizable functional groups more than this is used, an obtained liquid crystal polymer may be instable and fragile.

In the optical element 1 of the invention, polymerizable liquid crystal molecules are aligned and polymerized, to thereby form a layer structure where polymerizable liquid crystal molecules are fixed in a definite alignment state. Accordingly, the optical element 1 can be used as an element that controls a polarization state of light such as an element that controls retardation and an element having the optical compensation function.

The optical element, when incorporating in a liquid crystal display device, can be incorporated by directly laminating and forming a birefringent layer on a substrate that constitutes a liquid crystal cell (display side substrate or driving liquid crystal side substrate) or inside of the substrate. Accordingly, there is no need of separately preparing an optical element followed by adhering the same to a liquid crystal cell with an adhesive. As the result, it is possible to produce a liquid crystal display device which can suppress a fear that, an adhesive layer is formed to thereby cause interfacial reflection of light at an interface between an adhesive layer and a layer in contact with the adhesive layer to generate scattering light and reduce the light leakage further. That is, a liquid crystal display device in which the contrast is more improved and the color unevenness of a liquid crystal display screen is suppressed can be produced.

In the optical element 1 obtained according to a producing method of the invention, when the birefringent layer 4 has a crosslinked polymer structure where liquid crystal molecules are crosslinked, an adverse affect on the birefringent properties due to heat can be reduced and the heat resistance can be improved.

Figure 2:
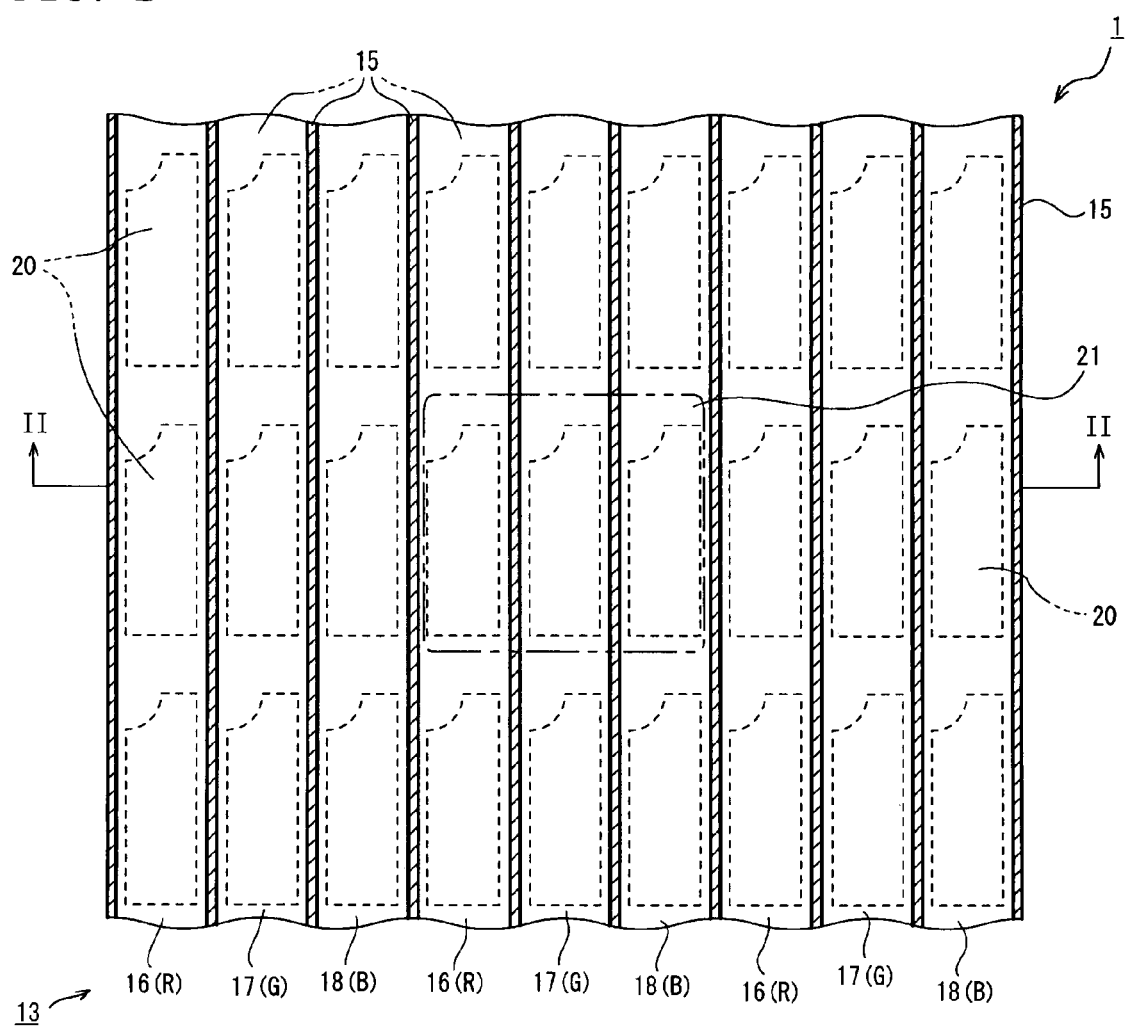
FIG. 2 is a schematic plan view for explaining an optical element provided with a colored layer in the invention.
Figure 3:
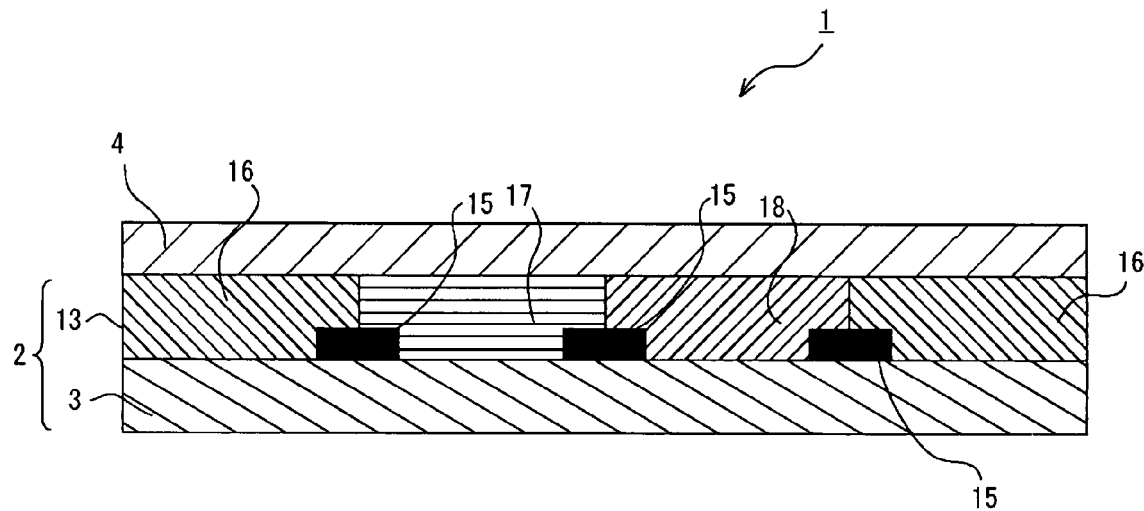
FIG. 3 is a schematic sectional view for explaining a II-II section in FIG. 2.

The optical element 1 of the invention may be provided with a colored layer 13. Such an optical element 1 will be described with a case where a base material 2 is constituted with a colored layer 13 formed on a surface of a base material forming material 3 as an example (FIGS. 2 and 3). FIG. 2 is a schematic plan view showing a cross section for describing one of examples of an optical element 1 provided with a colored layer 13. For the sake of convenience of description, a birefringent layer 4 is omitted in FIG. 2.

In the optical element 1, a light-shielding black matrix 15 is coated and formed in lattice vertically and horizontally on one surface of the base material forming material 3, whereby regions where the black matrix 15 is not formed are formed a lot as openings 20 in lattice point. That is, a region where the black matrix 15 is formed corresponds to a light-shielding portion and the opening 20 thereof corresponds to a light-transmitting portion.

Further, on the base material forming material 3, color patters 16, 17 and 18 of three colors are arranged in stripe so as to cover the openings 20 and the color patterns 16, 17 and 18 and the black matrix 15 form a colored layer 13 (FIGS. 2 and 3). The color patterns 16, 17 and 18 have the optical transparency and separate transmitting visible light into lights of red (R), green (G) and blue (B), respectively. Accordingly, as shown with a chain double-dashed line in FIG. 2, three openings 20 respectively covered by color patterns of three colors of RGB (a color pattern 16 of red (R), a color pattern 17 of green (G) and a color pattern 18 of blue (B)) combine to form one pixel 21. The base material forming material 3 and the colored layer 13 constitute a base material 2.

The black matrix 15 has a function of inhibiting the color patterns 16, 17 and 18 coated substantially in stripe from causing color mixing, of partitioning the openings 20 in plan view to clearly visualize a contuor of the pixel 21 and of hiding a driving circuit and a liquid crystal driving electrode, which are usually arranged to a liquid crystal cell when the optical element 1 is incorporated in the liquid crystal cell, from transmitting light.

However, in the invention, depending on applications and optical specifications of the optical element 1, the black matrix 15 may be made unnecessary (in this case, the colored layer 13 is formed of color patterns) and, even when the black matrix 15 is used, the black matrix may be formed in, other than rectangular lattice, stripe and triangular lattice. Furthermore, regarding the color patterns that constitute the colored layer 13 as well, other than a case of three colors of the RGB system, a CMY system that is a complimentary color system thereof can be adopted. Still furthermore, the case of single color or two color system or a case of four colors or more can be adopted. Furthermore, regarding a shape of color pattern as well, other than a case of forming in stripe pattern, a case of a pattern coated on an entire surface on the base material forming material 3 and a case where rectangular or triangular fine patterns are dispersively arranged a lot on the base material forming material 3 can be adopted.

Each of the color patterns 16, 17 and 18 can be formed in such a manner that a coloring material dispersion solution in which a coloring material corresponding to each of color kinds is dissolved in a solvent is coated on a base material forming material 3 to form a coating film and the coating film is patterned into a predetermined shape such as stripe by use of, for example, a photolithography method. In addition to the above, each of the color patterns can be also formed also by coating the coloring material dispersion solution corresponding to the color kind in a predetermined shape on the base material forming material 3.

The black matrix 15 can be formed by patterning a light-shielding or light-absorbing metal thin film such as a metal chromium thin film or a tungsten thin film on a surface of the base material forming material 3. Furthermore, the black matrix 15 can be formed also by printing an organic material such as a black resin in a predetermined shape.

In the optical element 1, the birefringent layer 4 is laminated and formed on the colored layer 13 of the base material 2 so as to cover the colored layer 13. When thus formed, since the heat resistance of the birefringent layer 4 is relatively high, the colored layer 13 covered by the birefringent layer 4 can be also improved in the heat resistance. The birefringent layer 4, in accordance with the function thereof (such as the optical compensation function (for example, a function as a [+C plate])), can be appropriately formed as mentioned above.

An optical element 1 having a colored layer 13 is not restricted to the case where a colored layer 13 is formed on the base material forming material 3 to form a base material 2, followed by forming a birefringent layer 4 on the colored layer 13, and can be also constituted by forming the birefringent layer 4 to a base material 2 made of the base material forming material 3, followed by further forming a colored layer 13 on the birefringent layer 4.

Furthermore, in an example of an optical element 1 having the colored layer 13, both of color patterns 16, 17 and 18 and the black matrix 15, which constitute the colored layer 13, are arranged between the base material forming material 3 and the birefringent layer 4. However, the optical element 1 can be also constituted such that part of the color patterns 16, 17 and 18 and the black matrix 15, which constitute the colored layer 13, is interposed between the base material forming material 3 and the birefringent layer 4, and that the rest (among the color patterns 16, 17 and 18 and the black matrix 15, ones that are not interposed between the base material forming material 3 and the birefringent layer 4) is arranged outside of a position between the base material forming material 3 and the birefringent layer 4. For example, an optical element 1 can be produced in such a manner that the black matrix 15 that is part of the colored layer 13 is formed on the base material forming material 3 to form a base material 2, and a birefringent layer 4 is formed on the black matrix 15 of the base material 2, followed by forming the color patterns 16, 17 and 18 on the birefringent layer 4.

An optical element 1 provided with such a colored layer 13 is incorporated as a color filter in an optical instrument such as a liquid crystal display device and used as a display side substrate.

Next, a liquid crystal cell and a liquid crystal display device, which use the optical element 1 of the invention will be described.

Figure 4:
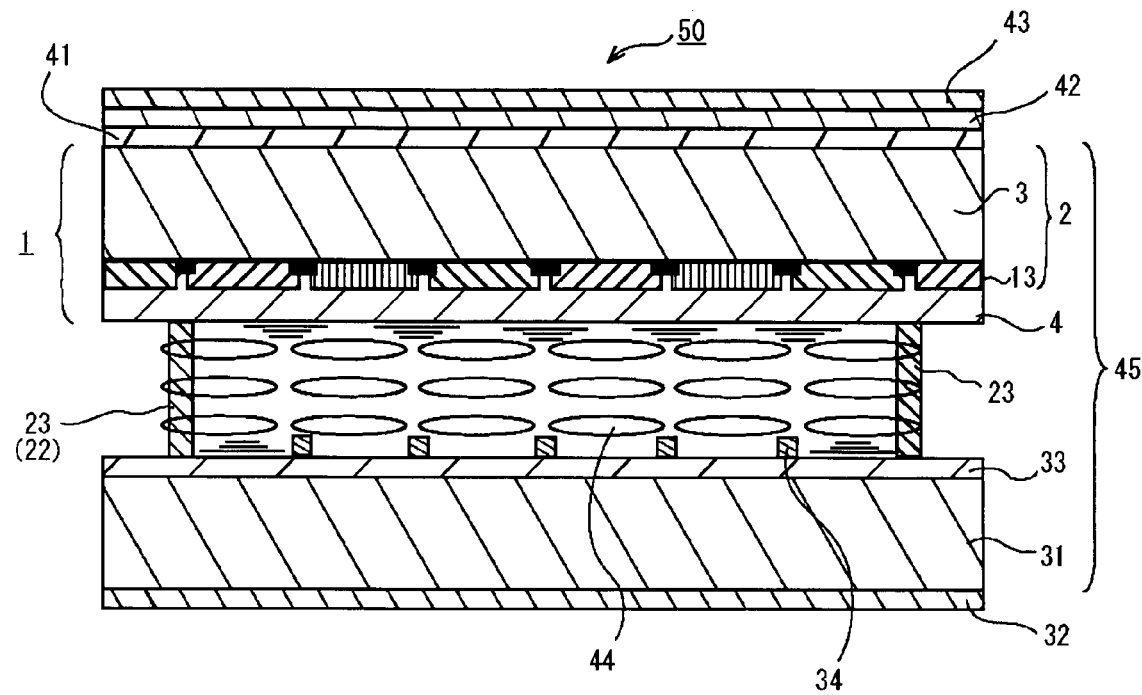
FIG. 4 is a schematic sectional view for explaining a liquid crystal cell in which an optical element of the invention is incorporated and a liquid crystal display device.

The liquid crystal cell or liquid crystal display device will be described with one where an optical element 1 incorporated therein has a colored layer 13 on a base material 2 as an example. FIG. 4 is a schematic longitudinal sectional view for describing a liquid crystal cell 45 and a liquid crystal display device 50.

A liquid crystal cell 45 of a liquid crystal display device 50 is formed, as shown in FIG. 4, by encapsulating a liquid crystal composition (driving liquid crystal) containing driving liquid crystal molecules 44 between an optical element 1 and a driving liquid crystal side substrate 31, which face each other, to form a driving liquid crystal layer. In the liquid crystal cell 45, the optical element 1 works as a color filter as well as a member that works as a display side substrate. In the optical element 1, a birefringent layer 4 is formed covering a surface of a colored layer 13 of a base material 2 formed by laminating the colored layer 13 on a base material forming material 3, and further on the birefringent layer 4, base end portions of columnar bodies 23 that constitute a columnar layer 22 (upper side in the same drawing) are substantially evenly dispersively arranged a lot on a region corresponding to a region of forming the black matrix of the colored layer 13 and on a surface of the birefringent layer 4 and tip end portions of the lot of columnar bodies 23 (lower side in the same drawing) come into contact with the driving liquid crystal side substrate 31 provided with a liquid crystal driving electrode 34. In FIG. 4, for the sake of description conveniences, as the columnar bodies 23, only ones that are located at the outermost circumference of the liquid crystal cell 45 are shown.

On a surface on an in-cell side of the driving liquid crystal side substrate 31 (of two surfaces that are placed back to back in a thickness direction of one substrate (for example, a driving liquid crystal side substrate), one shorter in a distance with a driving liquid crystal layer), a driving circuit 33 that switching drives driving liquid crystal molecules 44 of driving liquid crystal and a liquid crystal driving electrode 34 of which loading amount of a voltage is controlled by the driving circuit 33 are arranged.

In the liquid crystal display device 50, on an observer side of the optical element 1 of the liquid crystal cell 45 (upper side in the drawing), a [+A plate], namely, a positive A plate 42 and a [−C plate], namely, a negative C plate 41, and a linear polarization plate 43 are arranged on an out-cell side (in the drawing, a side opposite to the in-cell side and an upper side than the liquid crystal cell 45). Furthermore, on the out-cell side of the driving liquid crystal side substrate 31 (in the drawing, a side opposite to the in-cell side and lower than the liquid crystal cell 45), a linear polarization plate 32 is arranged.

When the liquid crystal display device 50 is operated in an IPS mode, a linear polarization plate 43 arranged on the out-cell side of the optical element 1 and a linear polarization plate 32 of the driving liquid crystal side substrate 31 are arranged so that transmission axes thereof may be orthogonal to each other. Furthermore, in the liquid crystal display device 50, a not shown backlight unit is arranged on a back side of the driving liquid crystal side substrate 31.

The liquid crystal cell 45 and liquid crystal display device 50 in the invention are constituted so that a distance between the optical element 1 and the driving liquid crystal side substrate 31 may be maintained by the columnar bodies 23. When a pressing force is externally applied on the liquid crystal display device, since the birefringent layer 4 in the optical element 1 is formed hard so that the indentation depth that is a measure of the hardness that reflects actual conditions of the liquid crystal display device may be 6% or less to a thickness of the birefringent layer, fear that base end portions of the columnar bodies 23 largely subside in the birefringent layer 4 can be effectively reduced. Accordingly, even when the pressing load is applied, the liquid crystal display device 50 can exert more stable optical performance.

Next, with a case where the birefringent layer 4 is a +C plate (positive C plate) as an example, examples of optical elements will be described.

EXAMPLES

Example 1

Firstly, a glass substrate (trade name: #7059 Glass, produced by Corning Inc.) was prepared as a base material forming material and with a colorant dispersion solution a colored layer was formed on the glass substrate to form a base material. The colored layer is formed as shown below.

[Formation of Colored Layer]
<Preparation of Colorant Dispersion Solution used in Preparation of Colored Layer>

As colorant dispersion solutions of a black matrix (BM) and color patterns of red (R), green (G) and blue (B), pigment dispersion type photoresists were used. Using a pigment as a colorant, a dispersion solution composition (containing a pigment, a dispersant and a solvent) and beads were dispersed together for 3 hr by use of a disperser, followed by removing beads to obtain a dispersion solution. Then, the dispersion solution and a clear resist composition (containing a polymer, a monomer, an additive, a polymerization initiator and a solvent) are mixed to obtain the pigment dispersion type photoresist. The obtained pigment dispersion type photoresist had a composition such as shown below. A paint shaker (produced by Asada Iron Works Co., Ltd.) was used as the disperser.

| (Photoresist for Black Matrix) | |
|---|---|
| Black pigment (trade name: TM Black #9550, produced by Dainichiseika Color & Chemicals Mfg. Co., Ltd.) | 14.0 parts by weight |
| Dispersant (trade name: Disperbyk 111, produced by BYK Japan K.K.) | 1.2 parts by weight |
| Polymer (trade name: VR60, produced by Showa Highpolymer Co., Ltd.) | 2.8 parts by weight |
| Monomer (trade name: SR399, produced by Sartomer Company Inc.) | 3.5 parts by weight |
| Additive (trade name: L-20, produced by Soken Chemical & Engineering Co., Ltd.) | 0.7 parts by weight |
| Initiator (2-benzil-2-dimethylamino-1-(4-morpholinophenyl)-butanone-1) | 1.6 parts by weight |
| Initiator (4,4'-diethylaminobenzophenone) | 0.3 parts by weight |
| Initiator (2,4-diethylthio xanthone) | 0.1 parts by weight |
| Solvent (ethylene glycol monobutyl ether) | 75.8 parts by weight |
| (Photoresist for Red (R) Colored Pixel) | |
| Red pigment (C.I.PR254 (trade name: chromophthal DPP Red BP, produced by Ciba Specialty Chemicals Inc.)) | 4.8 parts by weight |
| Yellow pigment (C.I.PY139 (trade name: Paliotol Yellow D1819, produced by BASF Ltd.)) | 1.2 parts by weight |
| Dispersant (trade name: Solsperse 24000, produced by Zeneca Co., Ltd.) | 3.0 parts by weight |
| Monomer (trade name: SR399, produced by Sartomer Company Inc.) | 4.0 parts by weight |
| Polymer 1 | 5.0 parts by weight |
| Initiator (trade name: Irgacure 907, produced by Ciba-Gaigy K.K.) | 1.4 parts by weight |
| Initiator (2,2'-bis(o-chrolophenyl)-4,5,4',5'-tetraphenyl-1,2'-biimidazole) | 0.6 parts by weight |
| Solvent (propylene glycol monomethyl ether acetate) | 80.0 parts by weight |
| (Photoresist for Green (G) Colored Pixel) | |
| Green pigment (C.I.PG7 (trade name: Seika fast Green 5316P, produced by Dainichiseika Color & Chemicals Mfg. Co., Ltd.)) | 3.7 parts by weight |
| Yellow pigment (C.I.PY139 (trade name: Paliotol Yellow D1819, produced by BASF Co., Ltd.) | 2.3 parts by weight |
| Dispersant (trade name: Solsperse 24000, produced by Zeneca Co., Ltd.) | 3.0 parts by weight |
| Monomer (trade name: SR399, produced by Sartomer Company Inc.) | 4.0 parts by weight |
| Polymer 1 | 5.0 parts by weight |
| Initiator (trade name: Irgacure 907, produced by Ciba-Gaigy K.K.) | 1.4 parts by weight |
| Initiator (2,2'-bis(o-chrolophenyl)-4,5,4',5'-tetraphenyl-1,2'-biimidazole) | 0.6 parts by weight |
| Solvent (propylene glycol monomethyl ether acetate) | 80.0 parts by weight |
| (Photoresist for Blue (B) Colored Pixel) | |
| Blue pigment (C.I.PB15:6 (trade name: Heliogen Blue L6700F, produced by BASF Co., Ltd.) | 4.6 parts by weight |
| Violet pigment (C.I.PV23 (trade name: Foster Perm RL-NF, produced by Clariant Co., Ltd.) | 1.4 parts by weight |
| Pigment derivative (trade name: Solsperse 12000, produced by Zeneca Co., Ltd.) | 0.6 parts by weight |
| Dispersant (trade name: Solsperse 24000, produced by Zeneca Co., Ltd.) | 2.4 parts by weight |
| Monomer (trade name: SR399, produced by Sartomer Company Inc.) | 4.0 parts by weight |
| Polymer 1 | 5.0 parts by weight |
| Initiator (trade name: Irgacure 907, produced by Ciba-Gaigy K.K.) | 1.4 parts by weight |
| Polymerization initiator (2,2'-bis(o-chrolophenyl)-4,5,4',5'-tetraphenyl-1,2'-biimidazole) | 0.6 parts by weight |
| Solvent (propylene glycol monomethyl ether acetate) | 80.0 parts by weight |

The polymer 1 is obtained by adding 16.9% by mole of 2-methacryloloxy ethyl isocyanate to 100% by mole of a copolymer of benzyl methacrylate: styrene: acrylic acid: 2-hydroxyethyl methacrylate=15.6:37.0:30.5:16.9 (by molar ratio) and has a weight average molecular weight of 42500.

<Formation of Colored Layer>

A glass substrate (trade name: #7059, produced by Corning Inc.) was prepared as a cleansed base material forming material, as shown below, a colorant dispersion solution of each of the colors was coated on a top surface thereof, to thereby obtain a base material where a colored layer was laminated and formed on the base material forming material.

In the beginning, a BM photoresist prepared above was coated on a glass substrate by use of a spin coating method, and subjected to pre-baking (preliminary baking) at 900° C. for 3 min, followed by exposing with a mask formed into a predetermined pattern (100 mJ/cm$^2$). Then, development was performed by spraying a 0.05% KOH aqueous solution for 60 sec, followed by post-baking at 200° C. for 30 min (baking), to thereby prepare a base material forming material (BM forming base material forming material) on which a BM having a thickness of 1.2 μm was formed.

Next, a red (R) pigment dispersion type photoresist prepared in advance so as to correspond to a position corresponding to a red color pattern was spin coated on the BM forming base material forming material, and was subjected to pre-baking at 80° C. for 3 min, followed by exposing UV-rays (300 mJ/cm$^2$) with a predetermined colored pattern photomask corresponding to a color pattern of the respective colors. Then, development was performed by spraying a 0.1% KOH aqueous solution for 60 sec, followed by post-baking (baking) at 200° C. for 60 min, to thereby form a red (R) color pattern having a film thickness of 2.6 μm at a predetermined position of the BM pattern.

Subsequently, a green (G) color pattern and a blue (B) color pattern were formed respectively by use of the same method as the pattern forming method for a color pattern of the Red (R).

Thus, a BM and a colored layer constituted of a red color pattern, a green color pattern and a blue color pattern were formed on the glass substrate, to thereby obtain a base material.

The thus obtained base material was set on a spin coater (trade name: 1H-360S, produced by Mikasa Co., Ltd.) and a liquid crystal composition solution prepared as shown below was spin coated on a surface of the base material to apply 3 (mL) of a liquid crystal composition solution on the base material, whereby a coating film for forming a birefringent layer was prepared.

[Preparation of Liquid Crystal Composition Solution]

Crosslinkable liquid crystal molecules that are a mixture of compounds (a) to (d) shown by [Chem 8] below as liquid crystal monomers, BHT (2,6-di-tert-butyl-4-hydroxytoluene) as a polymerization inhibitor, Irgacure 907 (trade name) as a polymerization initiator and dodecanol as another additive were mixed to prepare a composition (composition A) having a composition below. The composition A was prepared according to a description of Laid-Open No. 2004-524385. The composition A was dissolved in a solvent (propylene glycol monomethyl ether acetate (PGMEA)) to prepare a liquid crystal composition solution having a concentration of 20% by weight.

[Chem8]

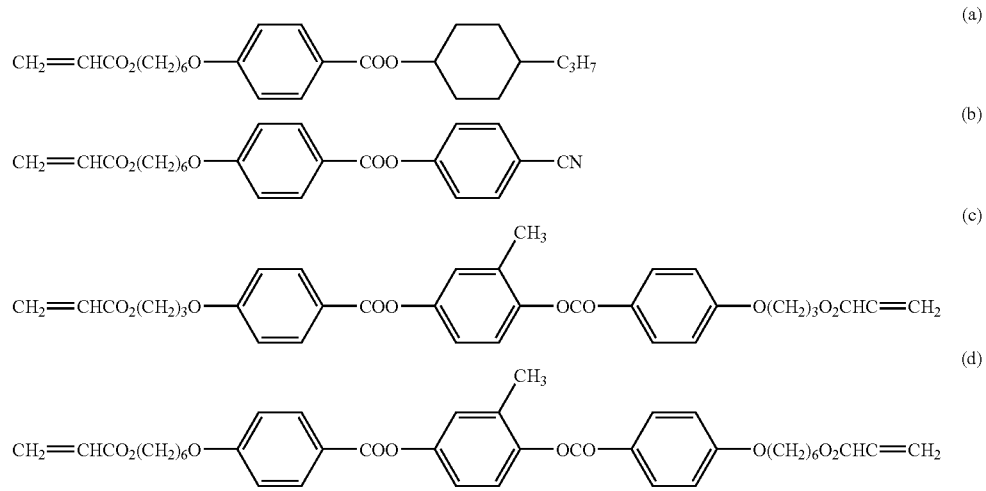

| Composition of Composition A | |
|---|---|
| Compound (a) | 32.67% by weight |
| Compound (b) | 18.67% by weight |
| Compound (c) | 21.00% by weight |
| Compound (d) | 21.00% by weight |
| Dodecanol | 1.02% by weight |
| BHT | 0.04% by weight |
| Irgacure 907 | 5.60% by weight |

[Formation of Liquid Crystal Phase State of Liquid Crystal Contained in Coating film for Forming a Birefringent Layer]

A substrate having a coating film for forming a birefringent layer formed thereon was dried under reduced pressure to remove the solvent. Next, the substrate was heated at 100° C. for 3 min on a hot plate to transform liquid crystal molecules contained in the coating film for forming a birefringent layer to a liquid crystal phase. The transformation to the liquid crystal phase was confirmed by visually observing that the coating film for forming a birefringent became a transparent state from a white turbid state. At this time, the liquid crystal molecules are imparted with the homeotropic alignment.

[Crosslinking and Polymerizing Reaction of Liquid Crystal Molecules]

Subsequently, under a nitrogen atmosphere, UV-rays of 20 mW/cm$^2$ output was illuminated for 10 sec from a UV illuminator (trade name: TOSCURE 751, produced by Harrison-Toshiba Lighting Co., Ltd.) on a transparent coating film for forming a birefringent to crosslink and polymerize liquid crystal molecules in the coating film for forming a birefringent layer, whereby the liquid crystal molecules were fixed with the alignment properties imparted thereto.

[Heating after Polymerization]

A base material having liquid crystal molecules fixed thereon was heated (calcination) at 230° C. for 1 hr by use of a calcination device (trade name: Hot Air Circulation Oven KLO-60M, produced by As One Corporation) (step of heating after polymerization). Owing to the heating after polymerization, a layer containing liquid crystal molecules crosslinked and polymerized on the base material was made a birefringent layer to obtain an optical element.

A magnitude of a thickness of the birefringent layer of the optical element obtained after the heating after polymerization was measured and found to be substantially 1.5 µm.

The optical characteristics of the obtained optical element were evaluated by measuring, as shown below, the retardation, haze, light leakage, Vickers hardness, indentation depth and rightness and wrongness of the optical element.

[Measurement of Retardation]

An optical element was set to a retardation measurement device and the retardation of the optical element was measured under the condition of a measurement wavelength of 550 nm from a thickness direction of the birefringent layer.

At this time, a magnitude of the retardation of the optical element was substantially 0 (zero) nm.

Furthermore, in a direction with a tilt of 450 to a thickness direction of the birefringent layer, similarly to the above, a magnitude of the retardation of the optical element was measured.

At this time, a magnitude of the retardation of the optical element was substantially 50 nm.

As a retardation measurement device, [KOBRA-21] (trade name, produced by Oji Scientific Instruments) was used.

[Measurement of Light Leakage]

When, with an optical element interposed between two polarization plates arranged in cross Nicol, light was illuminated from one polarization plate side and the optical element was rotated, whether light transmits two polarization plates or not was visually observed.

When the optical element is rotated, a propagating direction of light that comes incident on the optical element after passing through the polarization plates and a thickness direction of the optical element were kept substantially in parallel.

At this time, light passing through the two polarization plates was hardly observed, that is, the light leakage was hardly observed.

From the measurement of the retardation and the measurement of the light leakage, it was found that, in a birefringent layer of the optical element, the liquid crystal molecules were homeotropically aligned.

[Measurement of Vickers Hardness]

Of the optical element, a value of the Vickers hardness was measured. The value of the Vickers hardness here means a value measured according to a measurement method and measurement conditions below. That is, the value of the Vickers hardness means a value measured by a method where, by use of a surface film physical property tester (film hardness meter, a Fischer's scope H100VP-HCU X-Y PROG (trade name, produced by H. FISCHER Corp.)), the load was increased at 1 mN/sec for 5 sec to the maximum load of 5 mN which was maintained for 5 sec, followed by conversely reducing the load at 1 mN/sec. The results obtained are shown in Table 1. The load was applied by use of an indenter, and an indenter (Vickers indenter) defined in JIS B 7725 was used for the indenter. Specifically, the Vickers indenter was made of diamond and a tip end portion thereof was formed in quadrilateral.

[Measurement of Indentation Depth and Derivation of Indentation Deformation Rate]

In the measurement of the indentation depth of the optical element, the optical element was set to a hardness measurement device and a cylindrical diamond indenter having a diameter of 30 µm was used. At the measurement, the load was applied by use of the indenter to the optical element as shown below. That is, the load to the optical element was gradually increased at 10 mN/sec for 40 sec until the maximum load of 400 mN was attained, the value being maintained for 5 sec. Then, the load was conversely reduced at 10 mN/sec for 40 sec to 0 mN, followed by maintaining the value for 5 sec. The maximum depth of the indentation generated in the birefringent layer 4 at that time was taken as an indentation depth (µm). Furthermore, an indentation deformation rate (%) was derived by multiplying a value that is obtained by dividing the value of the indentation depth by a value of the thickness of the birefringent layer by 100. Here, as the hardness measurement device, a Fischer's scope H100VP-HCU X-Y PROG (trade name, produced by H. FISCHER Corp.) was used. The results obtained are shown in Table 1.

[Rightness or Wrongness of Optical Element]

A liquid crystal cell was prepared by incorporating an optical element and a pressing force was applied to the liquid crystal cell. Thereby, whether the optical element is good or bad was evaluated as follows.

<Preparation of Liquid Crystal Cell>

Firstly, a curable resin composition that becomes a material of spacers that are columnar bodies constituting a columnar layer was prepared as follows. That is, a copolymer resin solution (solid content: 50%), dipentaerythritol pentaacrylate (trade name: SR399, produced by Sartomer Company Inc.), o-cresol novolac epoxy resin (trade name: Epicoat 180S70, produced by Yuka Shell Epoxy Co., Ltd.), 2-methyl-1-(4-methylthiophenyl)-2-morpholinopropane-1-one and diethylene glycol dimethyl ether were agitated and mixed under room temperature to obtain a curable resin composition having a composition shown below.

Composition of Curable Resin Composition

Copolymer resin solution (solid content: 50%): 16 parts by weight dipentaerythritol pentaacrylate (trade name: SR399, produced by Sartomer Company Inc.): 24 parts by weight o-cresol novolac epoxy resin (trade name: Epicoat 180S70, produced by Yuka Shell Epoxy Co., Ltd.): 4 parts by weight, 2-methyl-1-(4-methylthiophenyl)-2-morpholinopropane-1-one: 4 parts by weight diethylene glycol dimethyl ether: 52 parts by weight The copolymer resin composition (solid content: 50%) was obtained as shown below.

In a polymerization vessel, 63 parts by weight of methyl methacrylate (MMA), 12 parts by weight of acrylic acid (AA), 6 parts by weight of 2-hydroxyethylmethacrylate (HEMA) and 88 parts by weight of diethylene glycol dimethyl ether (DMDG) were charged, followed by agitating and dissolving. Then, 7 parts by weight of 2,2'-azobis(2-methylbutylonitrile) was added thereto and uniformly dissolved, to thereby prepare a composition (composition Q). Thereafter, the composition Q was agitated at 85° C. for 2 hr under nitrogen gas flow, followed by polymerizing at 100° C. for 1 hr. 7 parts by weight of glycidyl methacrylate (GMA), 0.4 parts by weight of triethylamine and 0.2 parts by weight of hydroquinone were added to the polymerized composition Q, and the mixture was agitated at 100° C. for 5 hr, to thereby obtain a copolymer resin composition (solid content: 50%).

Next, a curable resin composition was coated on a birefringent layer of an optical element obtained in Example 1 by use of a spin coating method and dried, to thereby form a coating film. UV-rays were illuminated for 10 sec only on a formation region of a spacer on a black matrix by use of a super high pressure mercury lamp of 2.0 kW, with a photomask arranged at a distance of 100 μm from the coating film of a curable resin composition by a proximity aligner. Subsequently, the coating film was dipped in an aqueous solution of 0.05% by weight of potassium hydroxide (liquid temperature: 23° C.) for 1 min and subjected to alkali development to remove only an uncured portion of the coating film of the curable resin composition. Thereafter, a substrate was left in a 200° C. atmosphere for 30 min and subjected to heat treatment to thereby form cylindrical spacers (cylindrical spacers) having a diameter at a top end of 30 μm and a height of 3.2 μm. Then, an alignment film made of polyimide was formed on a birefringent layer of the optical element having cylindrical spacers formed thereon.

Furthermore, the optical element having the cylindrical spacers and the alignment film formed thereon and the glass substrate having a TFT formed thereon were arranged facing through the cylindrical spacers. An epoxy resin was used as a sealing material to seal a gap between the optical element and the glass substrate at a circumferential position of the optical element and the glass substrate, followed by applying pressure of 0.3 kg/cm$^2$ at 150° C. to join to form a cell assembly. Then, liquid crystal (trade name: ZLI4792, produced by Merck Ltd.) as a driving liquid crystal constituting a liquid crystal layer was encapsulated in a space formed between the optical element and the glass substrate facing the optical element, to thereby prepare a liquid crystal cell.

[Measurement of Rightness and Wrongness of Optical Element]

Whether the optical element is good or bad was measured by applying a force of a load of 4 kgf for 10 sec from a thickness direction of a liquid crystal cell, then releasing the load, and allowing displaying after 60 sec a white image on a screen of the liquid crystal cell to confirm a generation state of the display unevenness. The display unevenness in a screen was visually confirmed.

<Evaluation of Whether Optical Element is Good or Bad>

Whether the optical element is good or bad was evaluated as shown below.

Good: The display unevenness observed in an entire display region of a screen was suppressed to a region less than 50%.

bad: The display unevenness was observed in a region equal to 50% or more of an entire display region of a screen.

Example 2

An optical element was obtained in the same manner as in Example 1, except that a temperature at the heating after polymerization was set to 190° C. The optical characteristics of the optical element were evaluated in the same manner as in Example 1, and the results obtained are shown in Table 1.

Example 3

An optical element was obtained in the same manner as in Example 1, except that a temperature at the heating after polymerization was set to 160° C. The optical characteristics of the optical element were evaluated in the same manner as in Example 1, and the results obtained are shown in Table 1.

Example 4

An optical element was obtained in the same manner as in Example 3, except that as a liquid crystal composition solution used was one obtained by dissolving a composition B obtained as shown below in a solvent (propylene glycol monomethyl ether acetate (PGMEA)) and by controlling a concentration of the composition B to 20% by weight. The optical characteristics thereof were evaluated in the same manner as in Example 1, and the results obtained are shown in Table 1.

The composition B was obtained as a composition having the following composition by mixing the composition A and dipentaerythritol hexaacrylate (DPHA, produced by Daiseru-Cytec Company Ltd.) that was hexa-functional acrylate monomer.

| Composition of Composition B | |
| --- | --- |
| Composition A | 80% by weight |
| Dipentaerythritol hexaacrylate | 20% by weight |

Comparative Example 1

An optical element was obtained in the same manner as in Example 1, except that the heating after polymerization was not applied. The optical characteristics of the optical element were evaluated in the same manner as in Example 1, and the results obtained are shown in Table 1.

Comparative Example 2

An optical element was obtained in the same manner as in Example 1, except that a temperature at the heating after the polymerization was set to 100° C. The optical characteristics of the optical element were evaluated in the same manner as in Example 1, and the results obtained are shown in Table 1.

Comparative Example 3

An optical element was obtained in the same manner as in the same manner as in Example 1, except that a temperature at the heating after the polymerization was set to 140° C. The optical characteristics of the optical element were evaluated in the same manner as in Example 1, and the results obtained are shown in Table 1.

TABLE 1

|  | Liquid crystal composition | Heating temperature after polymerization (° C.) | Vickers hardness (N/mm²) | Indentation depth (μm) | Thickness of birefringent layer (μm) | Indentation deformation rate (%) | Display unevenness |
|---|---|---|---|---|---|---|---|
| Example 1 | A | 230 | 51 | 0.045 | 1.52 | 3.0 | Good |
| Example 2 | A | 190 | 35 | 0.051 | 1.45 | 3.5 | Good |
| Example 3 | A | 160 | 24 | 0.071 | 1.51 | 4.7 | Good |
| Example 4 | B | 160 | 10 | 0.013 | 1.5 | 0.9 | Good |
| Comparative Example 1 | A | none | 10 | 0.242 | 1.5 | 16.1 | Bad |
| Comparative Example 2 | A | 100 | 14 | 0.145 | 1.54 | 9.4 | Bad |
| Comparative Example 3 | A | 140 | 19 | 0.113 | 1.52 | 7.4 | Bad |

What is claimed is:

1. An optical element comprising:
a light-transmitting base material; and
a birefringent layer comprising of aligned and polymerized liquid crystal molecules and having a value of indentation depth of 6% or less relative to a thickness of the birefringent layer, wherein said value is measured under conditions where a cylindrical indenter having a diameter of 30 (μm) is applied at a load of 10 mN/sec up to the maximum load of 400 mN.

2. The optical element according to claim 1, wherein the birefringent layer is formed by heating the aligned and polymerized liquid crystal molecules at a temperature atmosphere in the range of 150° C. or more and 260° C. or less.

3. The optical element according to claim 1, wherein the birefringent layer is comprised of homeotropically aligned and polymerized liquid crystal molecules.

4. The optical element according to claim 1, wherein the birefringent layer is formed in such a manner that a liquid crystal composition containing liquid crystal molecules having a polymerizable functional group is coated on a base material to form a coating film for forming a birefringent layer, prescribed alignment is imparted to the liquid crystal molecules contained in the coating film for forming a birefringent layer and active radiation is illuminated on the coating film for forming a birefringent layer to polymerize liquid crystal molecules.

5. The optical element according to claim 1, wherein a colored layer in which light-transmitting color patterns are arranged is further arranged.

6. A liquid crystal cell comprising:
a display side substrate;
a driving liquid crystal side substrate that faces the display side substrate; and
a driving liquid crystal layer formed by encapsulating a liquid crystal material between the display side substrate and the driving liquid crystal side substrate,
wherein the optical element of claim 1 is incorporated in the display side substrate so as to arrange the birefringent layer between the base material and the driving liquid crystal layer.

7. A liquid crystal display device comprising:
the liquid crystal cell of claim 6 sandwiched between two polarization plates in a thickness direction of the liquid crystal cell.

8. A method of producing an optical element comprising:
coating on a base material a liquid crystal composition containing liquid crystal molecules having a polymerizable functional group to form a coating film for forming a birefringent layer;
imparting prescribed alignment properties to liquid crystal molecules contained in the coating film for forming a birefringent layer;
illuminating active radiation on the coating film for forming a birefringent layer to polymerize the liquid crystal molecules; and
heating the coating film for forming a birefringent layer in a temperature atmosphere from 150° C. to 260° C. to form the birefringent layer,
wherein a value of indentation depth measured under conditions where a cylindrical indenter having a diameter of 30 (μm) is applied at a load of 10 mN/sec until the maximum load of 400 mN is attained is 6% or less relative to a thickness of the birefringent layer.

* * * * *